United States Patent [19]

Willough

[11] 4,406,998

[45] Sep. 27, 1983

[54] NON-VERBAL COMMUNICATION DEVICE

[76] Inventor: Linda Willough, 10201 NE. 143rd St., Bothell, Wash. 98011

[21] Appl. No.: 246,009

[22] Filed: Mar. 20, 1981

[51] Int. Cl.³ .......................... G08B 5/00; G08B 5/36
[52] U.S. Cl. .......................... 340/815.01; 340/815.06; 340/815.12; 340/815.15; 340/815.2; 340/286 M; 340/717; 40/452; 40/572; 40/573; 40/575; 434/112; 434/430
[58] Field of Search ............... 340/378.1, 366 E, 802, 340/712, 286 R, 286 M, 524, 525, 709, 365 VL, 24, 711, 321, 756, 716, 796, 803, 734, 815.01, 815.06, 815.12, 815.2, 815.14-815.16, 705, 717; 434/112, 118, 430; 400/87; 40/452, 572, 573, 575

[56] References Cited

U.S. PATENT DOCUMENTS

| | | | |
|---|---|---|---|
| 2,595,980 | 5/1952 | Neubauer et al. | 116/315 |
| 3,573,792 | 4/1971 | Reed | 340/286 M |
| 3,600,592 | 8/1971 | Mahan et al. | 340/365 UL |
| 3,651,512 | 3/1972 | Summers | 340/365 R |
| 3,751,825 | 8/1973 | Barrett | 340/286 M |
| 3,760,360 | 9/1973 | Reynolds et al. | 340/365 VL |
| 3,768,079 | 10/1973 | Rawson et al. | 364/200 |
| 3,777,222 | 12/1973 | Harris | 340/365 S |
| 3,798,599 | 3/1974 | Kafafian | 340/825.19 |
| 3,818,448 | 6/1974 | Wilkins | 340/286 R |
| 3,925,779 | 12/1975 | Gerstenhaber | 340/803 |
| 4,241,521 | 12/1980 | Dufresne | 434/112 |
| 4,293,855 | 10/1981 | Perkins | 340/712 |

FOREIGN PATENT DOCUMENTS

| | | |
|---|---|---|
| 2507603 | 8/1975 | Fed. Rep. of Germany |
| 2465289 | 3/1981 | France |
| 608905 | 1/1979 | Switzerland |
| 2056729A | 3/1981 | United Kingdom |

OTHER PUBLICATIONS

IBM Technical Disclosure Bulletin, vol. 20, No. 4, Sep. 1977, pp. 1528-1529, New York, (USA), C. A. Rogers et al.: "Portable Conversation Device".

Primary Examiner—Donnie Lee Crosland
Attorney, Agent, or Firm—Seed, Berry, Vernon & Baynham

[57] ABSTRACT

A device for facilitating non-verbal communications between individuals. The device includes a two-sided panel containing a plurality of message blocks which are selectively illuminated by the individuals in a variety of modes. In a first mode, the message blocks are sequentially scanned in one of two patterns, with scan direction and termination being controlled by actuating a switch. In a second mode, a transparent, direct select keyboard is placed over the message blocks and individual message blocks are selected by touching the keyboard in front of the block to be selected. Finally, the position of the illuminated message block may be controlled by a job stick. The message blocks on the panel are printed on removable overlays which are specially adapted for various situations. The overlays carry identifying markings which are automatically read by the device so that the messages on the overlay, which are stored in non-volatile memory, can be correlated to their position on the panel. The overlays include a number of special function blocks which, when selected, cause the device to operate a wheelchair, sound an audio alarm, communicate with a computer or other device through a serial I/O port, or communicate ultrasonically with external devices. Each message block may include several different messages, with the message selected in that block being designated by a corresponding level-selection block. The messages may be either letters or words, and the combination of letters and words may be accumulated in an alphanumeric display or a printer.

24 Claims, 20 Drawing Figures

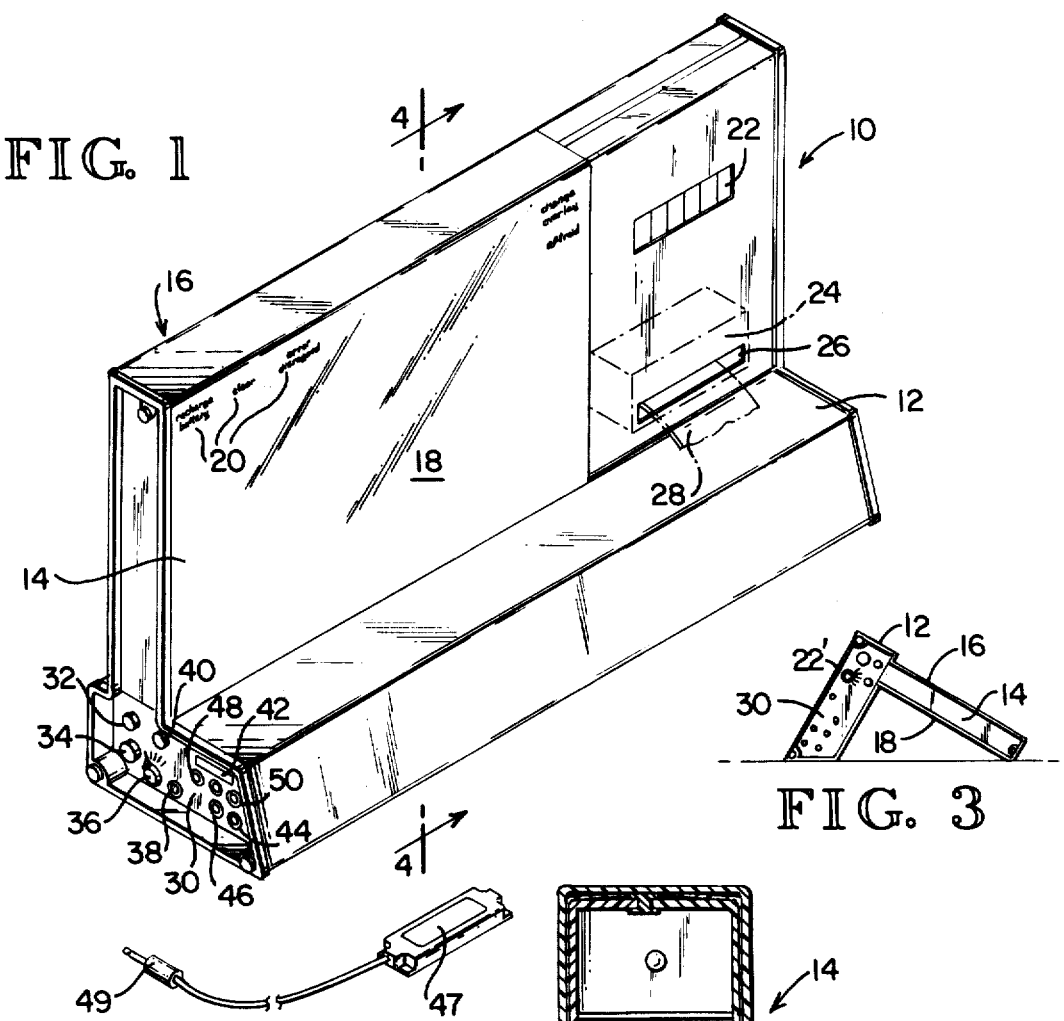
FIG. 1
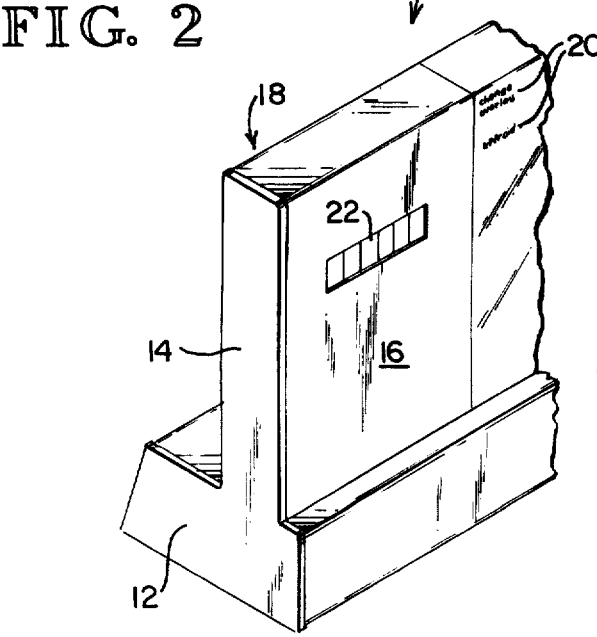
FIG. 2
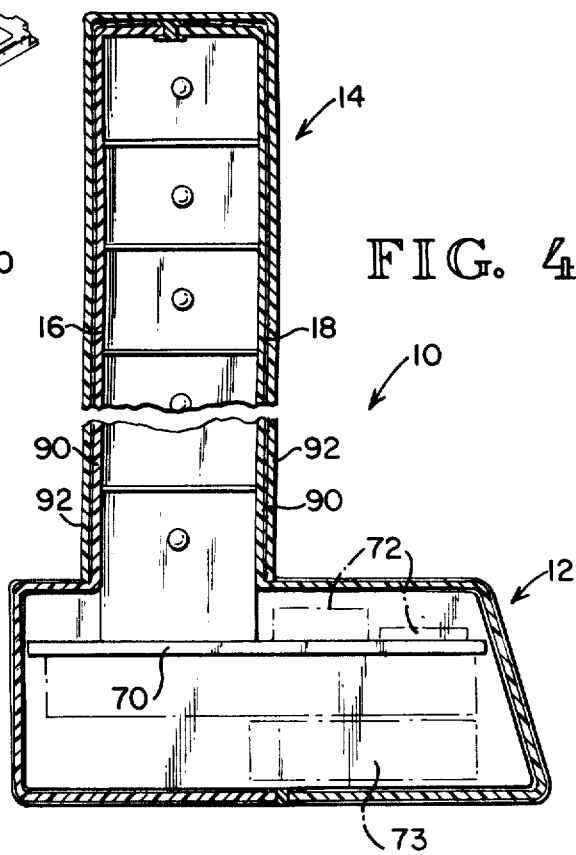
FIG. 3
FIG. 4

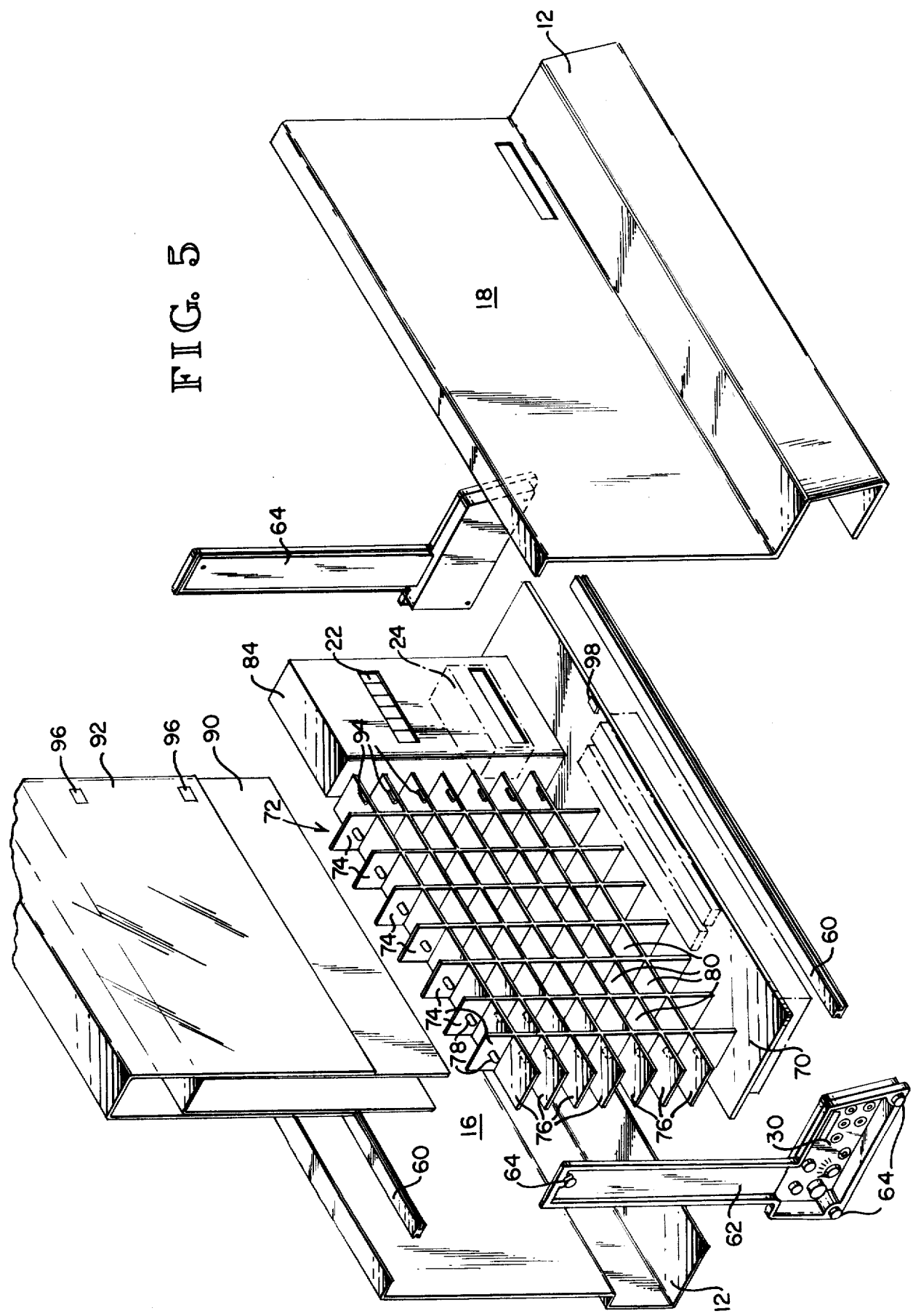

| recharge battery | clear | error disregard | alarm | words | alphabet numbers | O question | change overlay |
|---|---|---|---|---|---|---|---|
| T hello | H good-bye | D come | Y go | P food | 1 drink | 2 o.k. | 3 afraid |
| E i | R you | V is, are am | B want | K bathroom | 4 sleep | 5 happy | 6 sad |
| A yes | I no | L like | M dislike | X light | 7 t.v. | 8 hot | 9 cold |
| S please | N thank-you | O do | U not | J clothing | + time | − angry | = pain |
| W on | O off | F call | C bring | Q talk | Z music | X move | ÷ wet |
|  |  |  | doctor | nurse | aid | medicine | blanket |
|  |  |  | sit up | lie down | help | lab test | pillow |

| LEVEL I | LEVEL II | LEVEL III | LEVEL IV | SPACE | ERROR/ DELETE | DISPLAY ADVANCE | ALARM |
|---|---|---|---|---|---|---|---|
| A about afraid after | B better between bring | C ever excuse me feel | D her here him | E me more most | F over please put | CHANGE OVERLAY | PRINTER ON |
| G again all also | H but by call | I find food for | J his hot how | K move much my | . question right room | , the them then | -ED was we were |
| L am am and | M can chair clothing | N from get give | O hurt if in | P need night no | ? sad same say | ! there these they | -ER what when where |
| Q angry any are | R cold come could | S go good good-bye | T is it just | U not now of | ; see she should | : thing think this | -ES which who why |
| V around ask at | W day did different | X got had happy | Y know let light | Z off o.k. on | " so some still | − those time to | -EST will wish with |
| 1 be bad bathroom | 2 do down drink | 3 hard has have | 4 like look long | 5 one only open | x take talk tell | ÷ tomorrow try up | -ING would yes you |
| 6 be because before | 7 eat enough ever | 8 he hello help | 9 little make may | 0 opposite at out | + then thank-you that | − us very want | ENVIRON- MENT CONTROL |

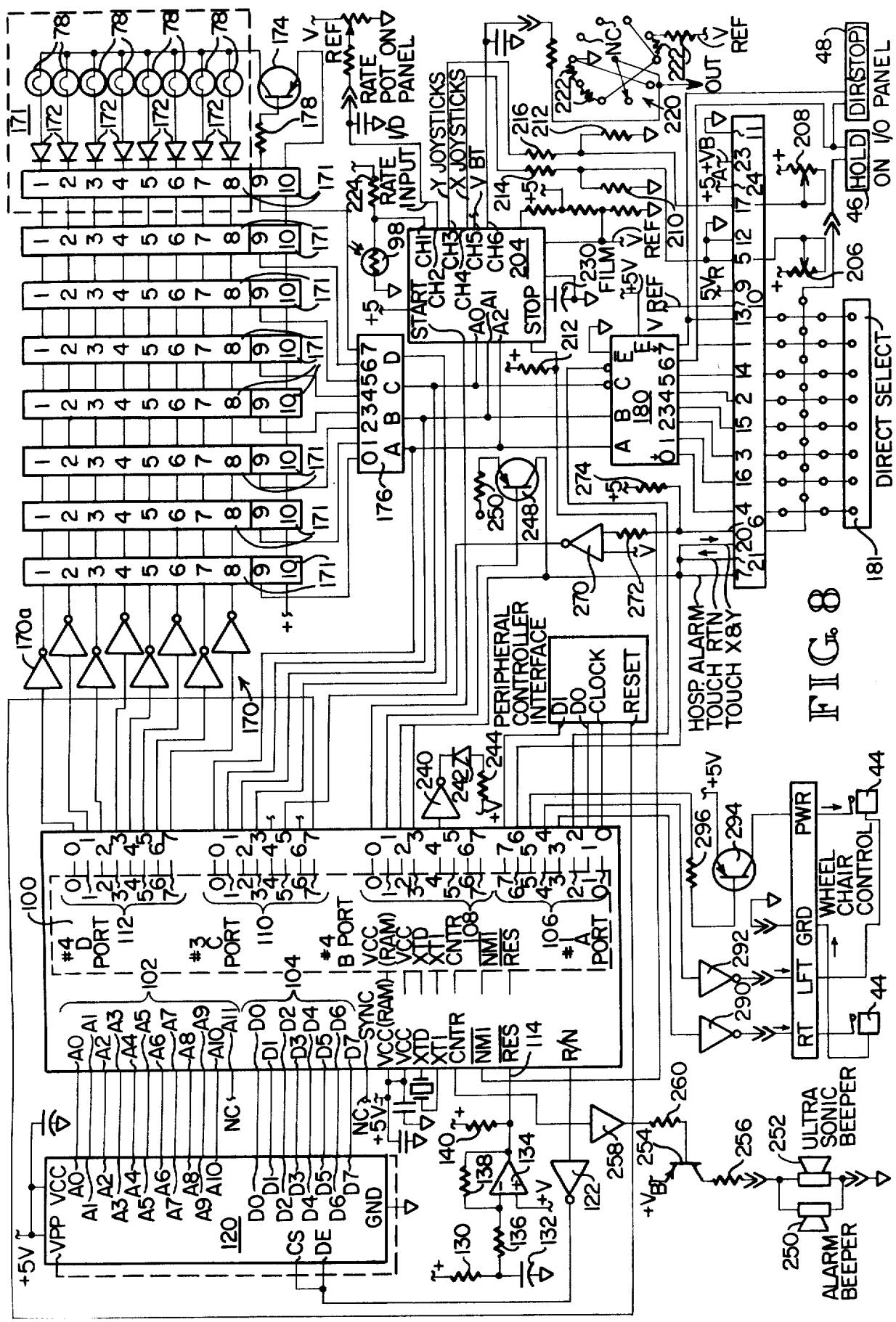

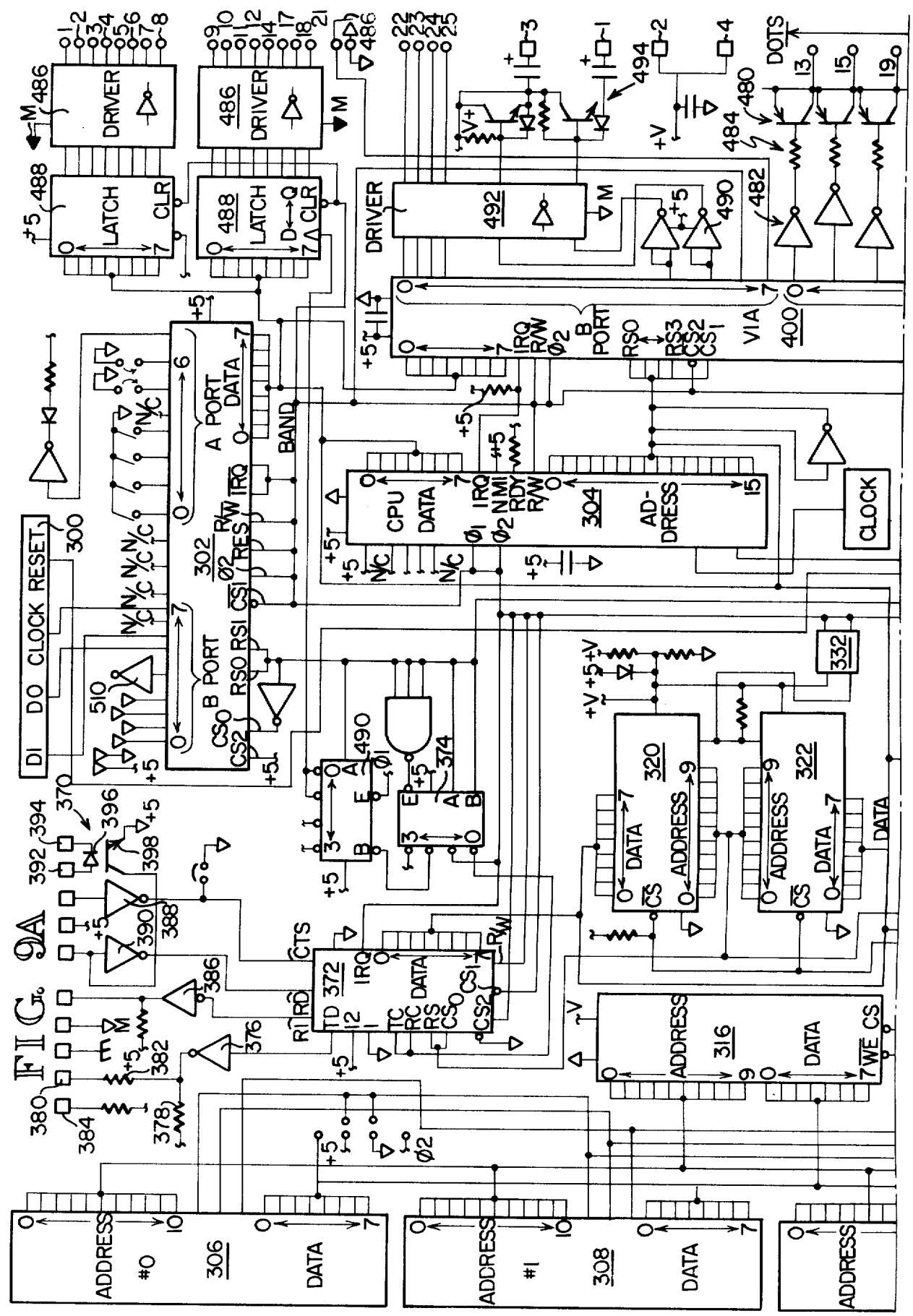

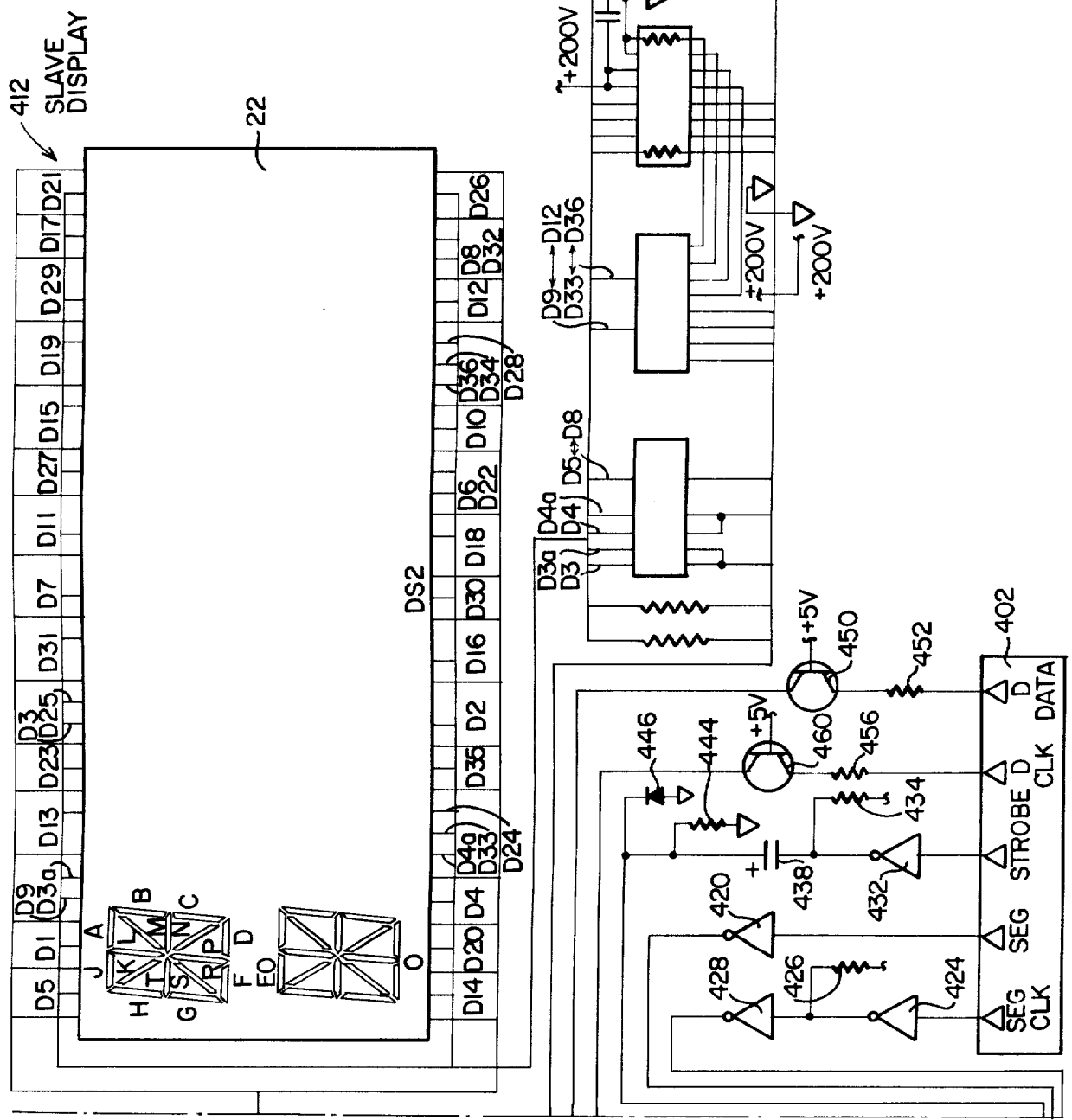

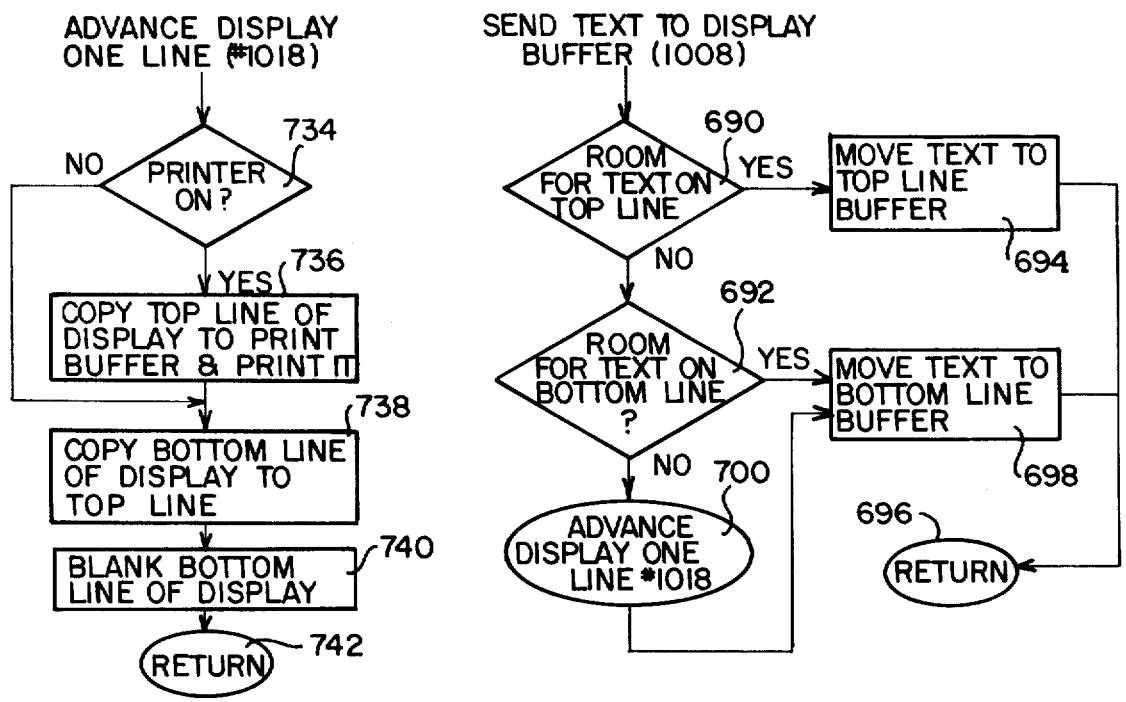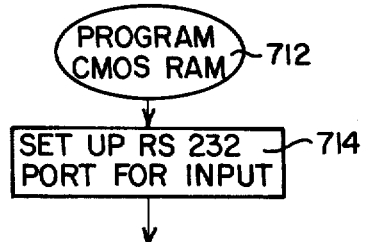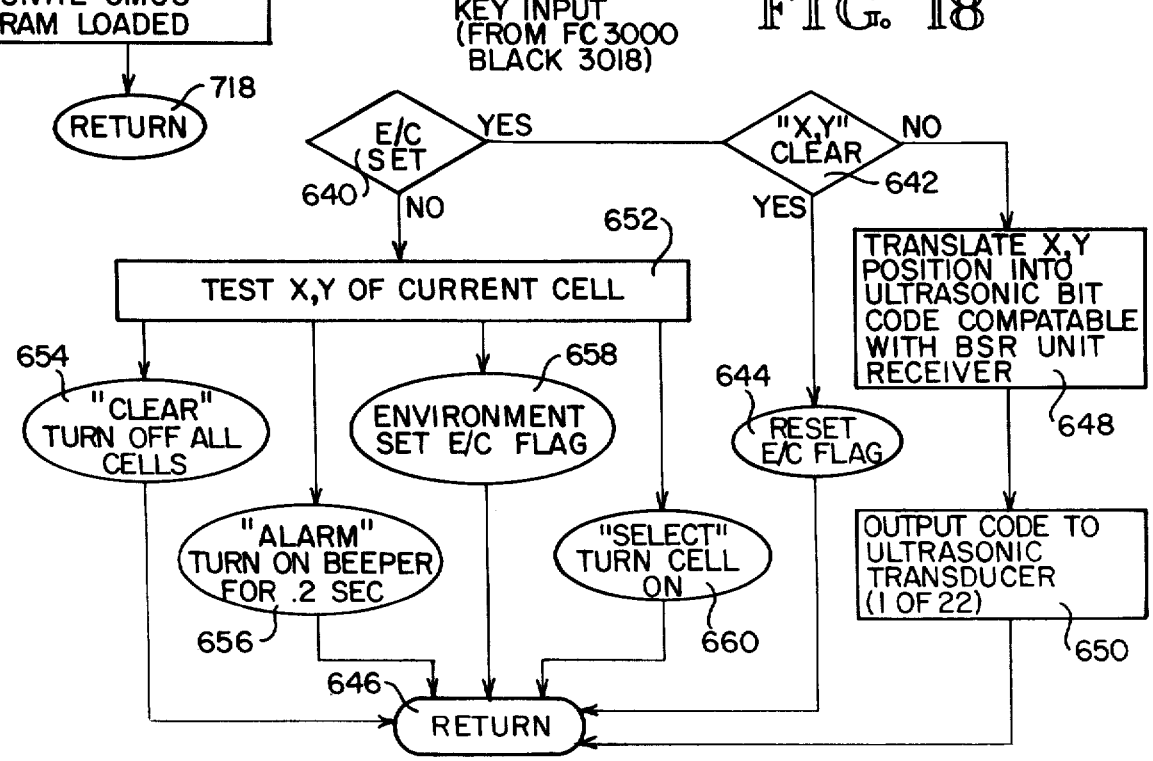
FIG. 17
FIG. 18

NON-VERBAL COMMUNICATION DEVICE

DESCRIPTION

1. Technical Field

This invention relates to electronic non-verbal communication devices, and, more particularly, to a device communicating through a panel of selectively illuminated message blocks.

2. Background Art

Profoundly handicapped individuals are often unable to speak or hear and are thus unable to verbally communicate. While many of these individuals have sufficient manual dexterity to communicate through such devices as a typewriter, others are unable to do so. For these individuals, communication, either verbally or non-verbally, is often extremely difficult or even impossible.

Although devices are available which have panels in which individual portions or messages are illuminated, the manner in which the messages are arranged leaves much to be desired. In such devices, the messages are not arranged in any logical sequence, thus materially reducing the speed with which a number of message blocks can be selected. Also, of course, since only single messages can be selected, it is difficult if not impossible to spell out or select lengthy statements by combining a large number of selected message blocks inasmuch as it would be necessary to remember the message blocks in their selected order.

Other shortcomings of conventional devices for allowing non-verbal communication are limited in their ability to carry out functions which go beyond merely communicating. For example, many profoundly handicapped individuals use a wheelchair, and they lack sufficient dexterity to properly manipulate either the wheelchair conventional wheelchair controller, Thus, while the communication device allows the individual to ask another to manipulate the wheelchair, it does not allow the individual to manipulate the wheelchair himself.

Conventional non-verbal communication devices are also limited in their ability to communicate non-visually with external devices, such as computers, data terminals, remotely switched devices, etc.

In summary, then, conventional, non-verbal communication devices are, at best, inefficient devices to allow individuals to communicate with another individual but they do not efficiently allow interpersonal communications, they do not allow communications between an individual and external electronic devices, and they do not allow an individual to operate external equipment, such as wheelchairs, without assistance.

DISCLOSURE OF THE INVENTION

It is an object of the invention to provide a variety of operating modes for efficiently selecting individual message blocks on the panel of a non-verbal communication device.

It is another object of the invention to provide a device which is capable of displaying and printing a large number of sequentially selected message blocks so that relatively long messages can be generated.

It is another object of the invention to provide a device which converts selected message blocks to an electronic code which may be transmitted to an external device.

It is another object of the invention to generate control signals corresponding to respective message blocks which allow an individual to operate various external devices.

It is still another object of the invention to arrange message blocks on the panel of a non-verbal communication device so that each message block is positioned near message blocks having a high probability of being selected next.

It is a further object of the invention to provide a non-verbal communication device having a plurality of removable overlays which are read by the device to automatically program the device for that overlay.

It is a still further object of the invention to provide a non-verbal communication device having several messages in each message block and means for designating one as the selected message.

These and other objects of the invention are provided by a non-verbal communication device utilizing a display board having opposed light transmissive panels on which individual messages are placed in discrete message blocks. A light-emitting device is positioned between corresponding message blocks on each panel, and a control system selectively energizes the light-emitting devices in a variety of operating modes. In a scanning mode, the control system sequentially energizes the light-emitting devices and scanning is stopped to select a message block by actuating a switch. Alternatively, the control system may sequentially energize light-emitting devices in a given column; and a message block is selected by first actuating a switch to change the direction of the scan at an appropriate row. The switch is once again actuated when the selected message block in that row is illuminated. Individual message blocks may also be selected by actuating a joy stick to reposition the illuminated message block in any direction. Also, a transparent direct select keyboard may be placed over the illuminated panel and individual message blocks may be selected by touching the keyboard in front of the message block to be selected. The messages contained in the message blocks may be specially adapted to provide a large vocabulary while allowing efficient selection of individual messages. Accordingly, each message block may contain several messages in respective levels with the level being designated by illuminating a respective level identifying block. The scanning time of the device is statistically minimized by placing a message close to other messages which are likely to be selected next. The flexibility of the system is enhanced by utilizing removable overlays, each of which may be adapted for a special function. The overlays contain identifying markings which are read by the device. The messages in each of the overlays are recorded in a non-volatile memory so that the device, upon reading the overlay, is able to identify the message in each message block of the overlay. Means are also provided to allow messages from a plurality of sequentially selected message blocks to be accumulated in either a display, printer, or memory to allow texts of virtually any length to be generated. The device not only allows communication between individuals, but it also permits communication between an individual and external devices such as a computer through a serial I/O port through which the accumulated message is transmitted. The device may also be used to operate environmental equipment and machinery, such as wheelchairs, by either generating appropriate control signals or by generating an appropriately coded ultrasound signal which is received by conventional ultrasound control devices.

BRIEF DESCRIPTION OF THE DRAWINGS

FIG. 1 is an isometric view of the non-verbal communication device.

FIG. 2 is an end isometric view of the non-verbal communication device.

FIG. 3 is an end elevational view showing one operational mode of the non-verbal communication device.

FIG. 4 is a cross-sectional view taken along the line 4—4 of FIG. 1.

FIG. 5 is an exploded isometric view of the non-verbal communication device.

FIG. 6 is an isometric view of one example of a removable overlay for the non-verbal communication device.

FIG. 7 is a side elevational view of an overlay having message blocks containing multiple messages.

FIG. 8 is a schematic of the main control circuitry of the non-verbal communication device.

FIG. 17 is a flow chart of the software for controlling the display in which messages are accumulated.

FIG. 18 is a flow chart of a subroutine called by the mainline program.

BEST MODE FOR CARRYING OUT THE INVENTION

Figure 9B:
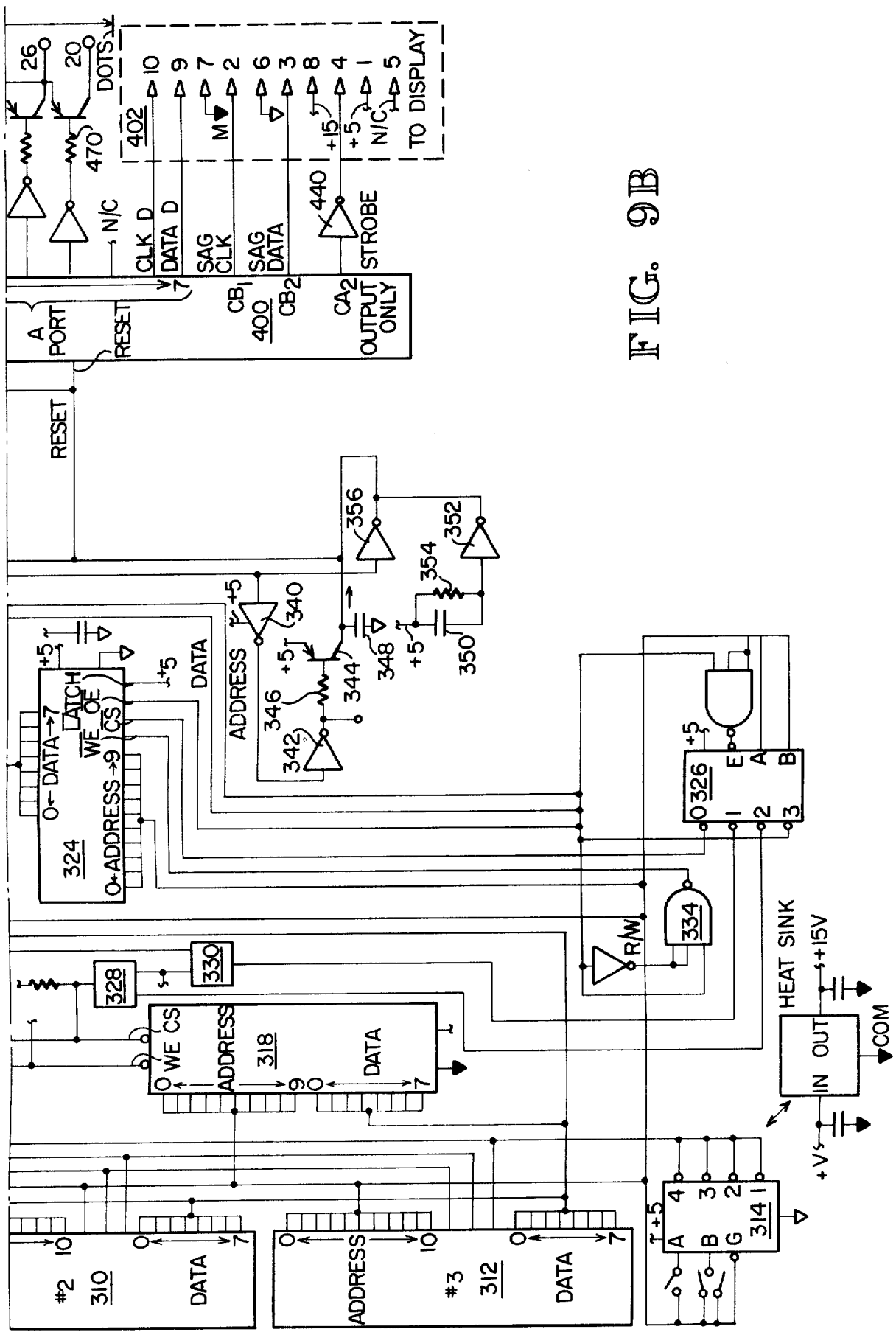
FIG. 9, consisting of A and B, is a schematic of peripheral control circuitry for the non-verbal communication device.

The communications device, as illustrated in FIGS. 1 and 2, includes a trapezoidal base portion 12 from which a display portion 14 projects upwardly. The display portion 14 includes a pair of opposed light transmissive panels 16,18 on which individual messages are placed in discrete message blocks 20. As explained in greater detail hereinafter the message blocks 20 are selectively illuminated to communicate the message contained in the message block. The righthand side of the display portion 14 contains peripheral devices, such as an alphanumeric display 22 and a printer 24 mounted behind a slot 26 through which a printed strip of paper 28 passes.

Although only one side of the display portion 14 is shown in FIG. 1, the other side of the display portion 14 is substantially identical except that it does not include a printer 24 as illustrated in FIG. 2.

The controls and input-output jacks for the device are located on an end panel 30 of the base portion 12 as illustrated in FIG. 1. Mounted on the panel 30 are a power switch 32, ultrasound communication device and audio alarm 34, a multiposition mode selector switch 36, and a rate potentiometer 38 for controlling the speed at which the message blocks are scanned. The end panel 30 also includes a battery charge input jack 40, a multi-pin jack 42 which receives inputs from either a joy stick or direct select keyboard (as explained in greater detail hereinafter), a pair of jacks 44 which are connected to a wheelchair controller, a jack 46 which is connected to a switch 47 through plug 49 for stopping the scanning in a sequential scanning mode (as explained in greater detail hereinafter), a jack 48 which is connected to the switch 47 for changing the direction of scanning and terminating scanning in an X-Y scanning mode and a rearming input 50 which is connected to an external switch to reactivate the device in the event that power has been automatically removed responsive to an inactive period longer than a predetermined duration. The device 10 automatically determines its operating mode in accordance with what type of controlling device is connected to its respective jack. In other words, when the switch is plugged into the jack 46, the device automatically causes the message blocks 20 to be scanned in a sequential scanning mode. Yet when that same switch is plugged into the jack 48, the device automatically scans the message blocks 20 in a row column mode. Plugging the joy stick into multi-pin jack 42 causes the message blocks 20 to be illuminated in a direction corresponding to movement of the joy stick, while plugging the direct select keyboard into jack 42 causes the device to illuminate message blocks corresponding to the selected keys.

The embodiment illustrated in FIG. 2 is especially adapted to allow communication between individuals located on opposite sides of the display portion 14. Accordingly, an alphanumeric display 22 is located on each panel 16, 18. The device may also be used as illustrated in FIG. 3, since the bevel of the base 12 allows the device to be stably supported on a horizontal surface. In the embodiment illustrated in FIG. 3, an alphanumeric display 22' is mounted on the lower surface of the base 12 and messages are selected preferably by mounting a direct select keyboard on the panel 16. The panel 16, when positioned as illustrated in FIG. 3, is angled toward the user to facilitate the selection of message blocks on the keyboard.

The internal structure of the communications device 10 is illustrated in greater detail in FIGS. 4 and 5. Opposite sides of the base 12 and panels 16, 18 are integrally formed and their adjacent edges are interconnected by a pair of spacers 60 having opposed edge receiving channels. End panels 62,64, one of which 62 is integrally formed with the control panel 30, cover the open ends of the panels 16,18 and base 12 and are connected to each other by rods having threaded ends (not shown) extending the length of the device. Fastening knobs 64 are then threaded on the ends of the rods to secure the panels 62,64 to each other. The panels have formed therein inwardly extending lips which overlap the panels 16,18 and base 12 to secure the panels 16,18 and base portions 12 to each other.

The upper portion of the base 12 has mounted therein a circuit board 70 on which electronic components 72 are mounted as shown in greater detail hereinafter. A rechargable battery 73 is mounted below the circuit board 70. A matrix 72 is formed by vertically positioned circuit boards 74 and horizontally positioned circuit boards 76. The vertical circuit boards 74 contain a plurality of conventional lamps 78 mounted between each pair of horizontal circuit boards 76. Each of the cells 80 formed by the circuit boards 74,76 contain one lamp 78. The cells 80 are aligned with respective message blocks 20 on the panels 16,18. Correspondency of illuminated message blocks on the panel 16 with the illuminated message blocks 18 is ensured since each lamp 78 illuminates the corresponding message blocks on both panels 16,18.

The righthand portion of the device includes a housing 84 on which the display 22 is mounted and inside which the printer 24 is located.

As mentioned above, the device preferably includes removable overlays to maximize the flexibility of use and the vocabulary of the device. The messages are printed on a relatively thin, flexible, light-transmissive sheet 90 which may be of mylar or a similar material. The sheet 90 is placed over the panels 16,18 as indicated and is held in place by a U-shaped bracket 92 of resilient, transparent material.

A plurality of light-emitting/light-detecting devices 94 are mounted on respective horizontal circuit boards 76. As illustrated in greater detail hereinafter, the emitter/detector devices 94 detect the presence or absence of identifying markings 96 on the inside surface of the overlay 90. This allows the device to automatically program itself for that overlay.

A light detector 98 similar to the light detector used in the emitter/detector devices 94 is mounted on the circuit board 70 for sensing ambient light in order to control the intensity of the illumination of lamps 78, as explained in greater detail hereinafter.

One example of a set of messages printed on an overlay 90 is illustrated on FIG. 6. The upper row of message blocks contain special instructions such as "RECHARGE BATTERY," "WORDS," "ALPHABET NUMBERS," "QUESTIONS," and "CHANGE OVERLAY." It also contains message blocks which not only communicate, but which also control the operation of the device. For example, the "CLEAR" block de-energizes all of the previously illuminated lamps 78. The "ALARM" block, when selected, causes an audible alarm to sound.

It will be noted that most of the message blocks contain both a word and either a letter or number. In the sequential scanning mode, for example, the first row is initially scanned and the switch is actuated when either the "WORDS" or "ALPHABET NUMBERS" block is illuminated to designate that either the words or alphanumeric in the illuminated block is being selected. The switch is then actuated again to cause the scan to resume and a message block is selected with the message being either a word or an alphanumeric, depending upon whether the "WORDS" or "ALPHABET NUMBERS" block is illuminated.

Still another overlay is illustrated in FIG. 7. In this overlay, the upper row contains four level blocks which correspond to the four messages in each message block. Thus, when level one is selected and the upper lefthand corner message block is illuminated, the letter "A" is selected. Selecting the same message block when the level four block is illuminated selects the word "AFTER." The overlay illustrated in FIG. 7 is also adapted to allow a large number of letters or words to be combined and accumulated in a display, printer or memory. Spaces between words or letters are generated by selecting the "SPACE" block in the upper row and previously selected words or letters may be deleted by selecting the "ERROR/DELETE" block. Similarly, the display can be advanced by illuminating the "DISPLAY/ADVANCE" block and the printer may be turned on by illuminating the "PRINTER ON" block.

It is apparent that the speed at which relatively long texts can be generated depends upon the length of time required to select one message block after the previous message block has been selected. In order to minimize the selection time, the words in the message blocks may be positioned so that messages which are likely to be selected in sequence are positioned next to each other. Thus, for example, in the overlay illustrated in FIG. 7, the word "GET" is located next to the word "CHAIR" because those two words are likely to be used next to each other. The particular positioning of the messages will, of course, depend upon a statistical analysis of the English language.

A schematic of the main control circuitry on the printed circuit board 70 is illustrated in FIG. 8. The circuitry includes a conventional microprocessor 100 having address ports 102, data ports 104, four eight-bit input/output ports 106,108,110,112, a reset input 114, and other terminals, such as power and ground needed to operate the microprocessor 100. Although various microprocessor circuits are commercially available, the operation of the device is explained herein with reference to an SY6500/1 microprocessor available from Synertek, Incorporated. This microprocessor 100 includes an internal timer which is used in the operation of the device, as explained hereinafter. The microprocessor 100 also includes an internal read-only memory which contains program instructions for operating the microprocessor in accordance with a flow chart explained in detail hereinafter. The microprocessor 100 operates in conjunction with a conventional eight-bit random access memory 120. Data is read from the memory 120 at the location determined the address inputs. Similarly, data on the data outputs 104 are read into address locations determined by the address inputs whenever a signal is applied to chip-select and device-enable inputs through inverter 122.

When power is initially applied to the device by actuating the power switch 34, it is necessary for the microprocessor 100 to be reset. Accordingly, the battery voltage is applied through resistor 130 to a capacitor 132 and to the summing junction of an operational amplifier 134 through resistor 136. The gain of the amplifier is controlled by the ratio of resistor 138 to resistor 136. Since the output of the operational amplifier 134 is an open collector, power is applied to the output transistor and amplifier 134 through resistor 140. When power is initially applied to the device, capacitor 132 begins charging through resistor 130. Thus the reset input 114 to the microprocessor 100 is held low until capacitor 132 charges to a predetermined level, thereby resetting the microprocessor 100.

The C and D I/O ports 110,112, respectively, are provided primarily to illuminate the lamps 78 (FIG. 5) for selectively illuminating the message blocks 20. Accordingly, the D port outputs 112 are connected to respective inverting drivers 170, each of which drives all column circuits 171 in parallel. Each circuit 171 includes a series combination of a lamp 78 and a diode 172 for each row. Thus driver 170a is connected to the diode 172 and lamp 78 for the top message block of each column circuit 171. All lamps 78 in a given column circuit 171 are connected to each other and to the collector of a power transistor 174 having an emitter connected to the battery. The bases of the transistors 174 are driven by a decoder 176 through respective resistors 178. The decoder sequentially selects each column as determined by a binary code from the first four bits of the C port 110. Thus power is first applied to all lamps 78 in the first column, and one or more lamps 78 in that column are illuminated by grounding the cathode of a selected diode 172 by applying a high to its corresponding driver 170. It will be understood, of course, that multiple lamps 78 of a given column can be simultaneously illuminated by simultaneously applying high signals to several drivers 170 from the D port 112. The signal at the C port then causes the decoder 176 to select the next column circuit 171, and the lamp(s) for the selected row(s) are then selected by the D port 112. The decoder 176 applies power to a column of lamps 78 only when the decoder 176 is enabled by the third output of the C port 110.

The first three bits of the C port 110 are also used to scan an external direct select keyboard which can be used to actuate specific message blocks. Accordingly, the three bits of the C port 110 are applied to a decoder 180 which, when enabled by a low on bit 6 of the A port 106, applies a low to one of eight columns of transparent, direct select keyboard 182 (FIG. 10), which is placed over the panels 16,18.

As illustrated in FIG. 1, the direct select keyboard 180 is a commercially available device sold by the Sierracin Manufacturing Company of Sunnyvale, Calif. Basically, the keyboard consists of a first sheet of transparent material having a plurality of thin, transparent conductive strips extending horizontally across its surface in rows. A second sheet, which is relatively flexible, is placed over the first sheet but is normally spaced apart from it by a short distance. The second sheet, which is adjacent to but spaced apart from the first sheet, has formed thereon a plurality of conductive strips extending vertically across its surface in columns. Thus, pressing the resilient second sheet against the first sheet connects one of the row strips to one of the column strips. The outputs of the decoder 180 are applied to respective tri-state buffers 183, which are enabled by a low applied to their enable inputs. The outputs of the buffers 183 are applied to respect row strips of the keyboard 182 and to the cathodes of respective diodes 184. The column strips on the second sheet of the keyboard 182 are applied to the cathodes of respective diodes 185 and to the outputs of respective tri-state buffers 186, which are enabled by a low applied to the enable input. The anodes of the diodes 184,185 are applied to respective NOR-gates 187,188, which are alternately enabled by a TOUCH X,Y input through inverter 189. The outputs of NOR-gates 187,188 are applied to NOR-gate 190. In operation, the row in which a selected message block is located is determined by applying a low to the TOUCH X,Y input from the A port of the microprocessor. The low TOUCH X,Y input enables NOR-gate 188, disables NOR-gate 187 through inverter 189, and enables buffers 183. Disabled NOR-gate 187 then enables NOR-gate 190. As decoder 180 sequentially applies a low to each output of its respective tri-state buffer 183, each row strip on the first sheet in the keyboard 182 goes low, as does the cathode of the corresponding diode 184. However, the low applied to NOR-gate 187 through the diodes 184 has no effect since NOR-gate 187 is disabled. As each row strip of the keyboard 182 is pulled low, a column output will change state if its corresponding column strip is pressed against that row strip. The column strips are normally held high through resistor 192, thereby applying a high to enabled NOR-gate 188, which generates a high at the output of enabled NOR-gate 190. Thus a high at the TOUCH RE-TURN output of NOR-gate 190 indicates that the selected message block is not in the row to which the low is currently being applied. When the low is applied to the row in which the selected message block is located, the cathode of the corresponding diode 185 is pulled low, thereby applying a low to NOR-gate 188, which generates a low at the output of NOR-gate 190. Thus, a low at the output of NOR-gate 190 indicates that the selected message block is in the row to which the low is currently being applied. The microprocessor 100 then checks the column strips by applying a high to the TOUCH X,Y input, which disables NOR-gate 188, and enables NOR-gate 187 and buffer 186 through inverter 189. The decoder 180 then sequentially applies a low to each tri-state buffer 186, thereby sequentially pulling each column strip of the second sheet in keyboard 182 low. A high is normally applied to the input of NOR-gate 187 through resistor 193. However, when a low is applied to the column strip in which the selected message block is located, the row strip corresponding to the row in which the message block is located goes low, thereby applying a low to the input of NOR-gate 187, which generates a low at the output of NOR-gate 190.

In summary, the row in which the selected message block is located is determined by applying a low to the TOUCH X,Y input, which enables buffers 183 and disables buffers 186. The TOUCH RETURN output then goes low when a low is applied to the row in which the selected message block is located. The column in which the selected message block is located is then determined by applying a high to the TOUCH X,Y input, which disables tri-state buffers 183 and enables buffers 186. The TOUCH RETURN output then goes low when a low is applied to the column strip corresponding to the column in which the selected message block is located. Once the microprocessor knows in which row and column the selected message block is located, it knows the exact location of the message block. Since the message in that message block is stored in read-only memory, the microprocessor 100 then knows the exact message.

The communications device 10 is also capable of sensing a number of analog signals which control the operation of the device. The rate potentiometer 38 forms a voltage divider so that the voltage on the wiper of potentiometer 38 varies as the wiper is moved. This analog voltage on the wiper is applied to a conventional analog-to-digital converter 204, explained in greater detail hereinafter.

The communications device may also employ a conventional joy stick to control the rate and direction of scanning of the blocks 20. The joy stick device basically includes a pair of potentiometers 206,208, each connected between ground and a positive voltage through resistors 210,212, respectively. The wipers of the potentiometers 206,208 are connected to respective inputs of the analog-to-digital converter through respective resistors 214,216. By varying the position of the joy stick, the voltages applied to the analog-to-digital converter 204, which correspond to the X and Y position of the joy stick, may be varied.

Another analog voltage is generated by a mode selector switch 220 which is selectively connected to various taps of a voltage divider formed by resistors 222. The voltage applied to the analog-to-digital convertor 204 thus varies depending upon the position of the mode selector switch 220. As explained in greater detail hereinafter, the mode selector switch 220 determines the quantity of lamps used to display each message block. For example, some overlays 14 may include only sixteen blocks, in which case each message block would be illuminated by four lamps.

A final analog signal is generated by the light detector 98, which receives power through resistor 224. The voltage from the detector 98 varies in accordance with the intensity of ambient light in order to allow the microprocessor 100 to adjust the brightness of the lamps 78 by adjusting the duration that the lamps 78 are illuminated.

The analog-to-digital convertor 204 processes one analog input at a time, the particular input to be processed being selected by a three-bit address from the same three bits of the C port which drive the decoders 176,180. A START pulse from the low-order bit of the B port 108 causes capacitor 230 to charge to the analog voltage applied to the selected input. When the signal applied to the START input goes high, the capacitor 230 begins discharging linearly at a controlled rate. When the voltage on capacitor 230 reaches zero volts, the STOP output of the analog-to-digital convertor 204, which is normally held high through resistor 212, goes low. The time required to discharge the capacitor 230 is thus directly proportional to the amplitude of the analog voltage applied to the analog-to-digital converter 204. During the period that the capacitor 230 is being discharged, the microprocessor 100 continues to perform other functions, such as illuminating the lamps 98 and scanning the keyboard 182. Since the microprocessor 100 is not continuously monitoring the status of the analog-to-digital convertor 204 at this time, it is necessary for the microprocessor to be interrupted when the capacitor 230 has been discharged. Consequently, the STOP signal is applied to the NMI input of the microprocessor 100 to cause processing of the program to be suspended. The contents of an internal counter in the microprocessor 100 are then read, and the microprocessor 100 calculates the value of the analog voltage from the time lapse between the high-to-low transition of the START signal and the high-to-low transition of the STOP signal.

The remaining bits of the B and C I/O ports 106, 108 are used to generate output signals for various purposes. One bit of the B I/O port 108 is applied to an inverter 240 which illuminates a light-emitting diode 242 powered through resistor 244 to indicate a system error. Another bit of the B I/O port is connected to the base of a transistor 248 to apply power to an external hospital alarm through resistor 250 in order summon a nurse.

The communications device is also capable of generating an audible alarm or an ultrasonic signal which communicates with conventional ultrasound actuating devices. As is well known in the art, these ultrasound devices may be used to apply power to various appliances or control equipment when they receive an appropriately coded ultrasound signal. The audible alarm beeper 250 and the ultrasound transducer 252 are connected in parallel and to the collector of a transistor 254 through resistor 256. The base of transistor 254 is connected to the output of a driver 258 through resistor 260. The input of driver 258 receives a CNTR output from microprocessor 100 having either an audio frequency or an ultrasound frequency. The audio frequency is applied through the driver 258 to the base of transistor 254 to apply power to both the audio alarm 250 and the ultrasound transducer 252 at an audio frequency. However, the ultrasound transducer 252 does not respond to the relatively low-frequency audio signal so that only an audible alarm is generated. Similarly, the ultrasound frequency from the CNTR output of the microprocessor 100 is applied to the base of transistor 254 through driver 258 to apply power to the alarm 250 and transducer 252 at an ultrasonic frequency. However, the audio alarm 250 does not respond to the ultrasound frequency, so only an ultrasound signal is generated.

As mentioned above in connection with the direct select keyboard 182, the decoder 180 sequentially pulses each of its outputs low. When the second-to-last output goes low and the switch 73 is plugged into jack 46 in the sequential scan mode, the low is also applied to the switch through jack 46 and the condition of the switch is tested by applying the other contact of the switch to a comparator 270 through resistor 272. The input to the comparator 270 is normally held high through resistor 274, but when the second-to-last output of the decoder 180 pulses low and the switch is closed, the input to comparator 270 goes low, which is detected by the microprocessor 100 to indicate switch closure. Similarly, when the switch is plugged into jack 48 in the row/column scan mode, the input to comparator 270 goes low when the low is generated by the last output of the decoder 180 whenever the switch is closed. Note that the output of the switch is applied to the same port of the microprocessor 100 in either the row/column or the sequential scan modes, but the time frame in which the signal is generated indicates whether the system is to operate in a row/column scan mode or a sequential scan mode.

The communications device 10 may also be used to control the operation of a wheelchair. Accordingly, two bits of the A port 106 are applied to a remote wheelchair control jacks 44 through respective inverters 290,292 to cause the right and left wheels of the wheelchair, respectively, to rotate. Power is applied to the wheelchair through transistor 294 when the base of transistor 294 is driven low through resistor 296. The output of inverter 290 controls the right wheel of the wheelchair, while the output from inverter 292 controls the left wheel of the wheelchair. The outputs from the inverters 290,292 are applied to a conventional digital proportional radio control device sold by the Futaba Corporation of America, of Compton, Calif. Basically, the Futaba device produces zero volts for an input of a center frequency, an increasing positive voltage in proportion to the frequency of the input above the center frequency, and a decreasing negative voltage in proportion to the decrease in frequency below the center frequency. The microprocessor 100 thus generates a signal having an appropriate frequency to cause each wheel of the wheelchair to move forwardly or rearwardly at any desired rate. The wheelchair control option is utilized by employing an overlay having message blocks marked "wheelchair left," "wheelchair right," "wheelchair forward," "wheelchair reverse," and "stop." An individual can thus cause the microprocessor 100 to move the wheelchair as desired by selecting the desired message block, as explained above.

As explained in greater detail hereinafter, the control circuitry illustrated in FIG. 8 operates a peripheral controller circuit which controls the printer 24, display 22, and a serial I/O port. Accordingly, the control circuitry illustrated in FIG. 8 is connected to the peripheral controller circuitry through a peripheral controller interface jack 300. The interconnection lines passing through the interface jack 300 include a data input DI line connected to an A port 106, a data out DO line connected to the A port 106, a CLOCK line also connected to the A port 106, and a RESET line connected to the C port 110. The signals on these lines are applied to an input/output device 302 illustrated in FIG. 9. The I/O device 302 includes a pair of eight-bit I/O ports which are selectively connected to an eight-bit data bus in accordance with the binary code of the signal applied to the RS0 and RS1 ports when a chip-select signal is received. The peripheral controller circuitry utilizes a conventional microprocessor 304 which interfaces with the microprocessor 100 in a serial mode. Accordingly, data is received by the microprocessor 304 through the DI line, which is strobed in synchronism with the CLOCK input. Data is transmitted from the microprocessor 304 to the microprocessor 100 through the DO line in synchronism with the CLOCK. Finally, the microprocessor 304 is reset through the RESET input. The microprocessor 304 utilizes external read-only memory chips 306–312, which are connected to the data and address buses of the microprocessor 304 in a conventional manner. Each of the read-only memory chips 306–312 is selected by a chip-select decoder 314 from the address bus.

The microprocessor 304 also interfaces with conventional random access memory 316–324, which is also connected to the address bus and data bus of the microprocessor 304. Individual random access memory chips 316–324 are selected by a chip-select decoder 326 from the address bus. The random access memory chips 316–322 are connected directly to the battery so that power is not removed therefrom when the power switch 32 is opened. Additionally, the chip-select signals generated by the decoder 326 for the random access memory chips 316–322 are applied through conventional power-sensitive switches 328,330 which automatically disconnect the decoder 326 from the respective chip-select inputs when power is removed in order to prevent the chips 316–322 from being inadvertently enabled. Similarly, the read/write output of the microprocessor 304 is applied to the write enable WE inputs of random access memory chips 316–322 through a power-sensitive switch 332 in order to prevent spurious data from being inadvertently written into the chips 316–322 as power is removed. In contrast, the write enable WE input to volatile memory chip 324 comes directly from NAND-gate 334, which applies the inverted R/W output of the microprocessor in synchronism with the clock signal to the WE input. Also, the chip-select input of the memory chip 324 comes directly from the decoder 326.

The RESET input to the I/O device 302 is used to apply power to the peripheral controller circuitry and to reset the microprocessor 304 when power is initially applied and removed. Accordingly, a low RESET input applies a high to the output of inverter 340, which generates a low at the output of inverter 342. The low is applied to the base of transistor 244 through resistor 246 to saturate transistor 244. The collector of transistor 244 then begins charging capacitor 248. The voltage across capacitor 248 is used to power the components of the peripheral control circuitry illustrated in FIG. 9. Before power has been applied to the peripheral controlled circuitry, the voltage across capacitor 250 is zero. When power is initially applied, the input to inverter 252 goes high, thereby applying a low to the RESET input until capacitor 250 discharges through resistor 254. The time constant of capacitor 250 and resistor 254 is longer than the time required for capacitor 248 to charge up to a sufficient voltage to operate the components. Therefore, the microprocessor 304 is reset for a period of time after power has been applied to the system. When the RESET input goes high, the output of inverter 256 immediately goes low, thereby resetting the microprocessor 304. The low RESET input also cuts off transistor 244, but the charge on capacitor 248 maintains power to the components until after the reset has occurred.

The peripheral controller circuitry includes a serial I/O port 370 which allows data stored in random access memory chips 320,322 to be serially output to an external device. Accordingly, data is applied to a shift register 372 from memory addresses determined by the microprocessor 304. The shift register 372, when enabled by a chip-select decoder 374, outputs the data in synchronism with the clock signal in either a current loop mode or a voltage mode. In a voltage mode, the data is generated at the output of inverter of 376, normally held high through resistor 378, and applied to terminal 380 through resistor 382. In a current loop mode, an external device is connected between terminal 380 and terminal 384 so that when the output of inverter 376 is low, current flows through the external device; and when the output of inverter 376 is high, no current flows through the external device. The shift register 372 also generates a request-to-send signal at the output of inverter 386. In operation, data is read from the shift register 372 by first writing a byte of data into the shift register 372. The shift register 372 then generates a request-to-send signal at the output of inverter 386. When the external device is able to receive the data, it generates a clear-to-send signal, which is applied to the shift register 372 through inverter 388. The shift register 372 then outputs the data in serial through inverter 376 in either the current loop or voltage mode.

Data may also be read into the shift register 372 in serial and then transferred to the random access memory chip 320 in parallel. Accordingly, an external device applies a read signal to the shift register 372 through inverter 390 and generates a binary signal between terminals 392 and 394. Current selectively flows through light-emitting diode 396, thereby saturating phototransistor 398 to apply data to the shift register 372. In this manner, a large number of messages selected from the message blocks which have accumulated in the memory chips 320,322 may be transmitted to an external device, such as a computer. Additionally, data from an external device, such as a computer, may be read into the memory chips 320,322 for a variety of purposes. For example, a programming overlay may be placed on the device having message blocks which identify various subroutines of a computer program. The subroutines would have been previously written into the memory chips 320,322, thereby allowing the user to generate a significantly larger program from the subroutines which is accumulated in the memory chips 320,322 and and later transmitted to an external device.

The microprocessor 304 also controls the operation of the display 22 and the printer 24. For this purpose, the microprocessor 304 communicates through an output expander 400 which selectively connects one of two output ports to the data bus of the microprocessor 304. The output port which is connected to the data bus is determined by the address bus through the RS0—RS3 and chip-select inputs which are connected to the address bus. Additionally, the output expander 400 receives the clock pulse so that it may operate synchronously therewith and it receives the RESET signal so that it may be reset upon power-up and power-down. Two bits of the A port, as well as CB1, CB2 and CA2 outputs, are connected to the display through display jack 402. The signals applied to the display driver circuitry through the jack 402 include a digit data output which identifies the digit of the multidigit display is being accessed, a digit clock which the digit data is sequenced with, a segment data output which identifies which of the seven segments of a display are illuminated for the selected digit, a segment clock with which the segment data is synchronized, and a strobe output applied through inverter 404 which turns on the display.

Figure 10A:
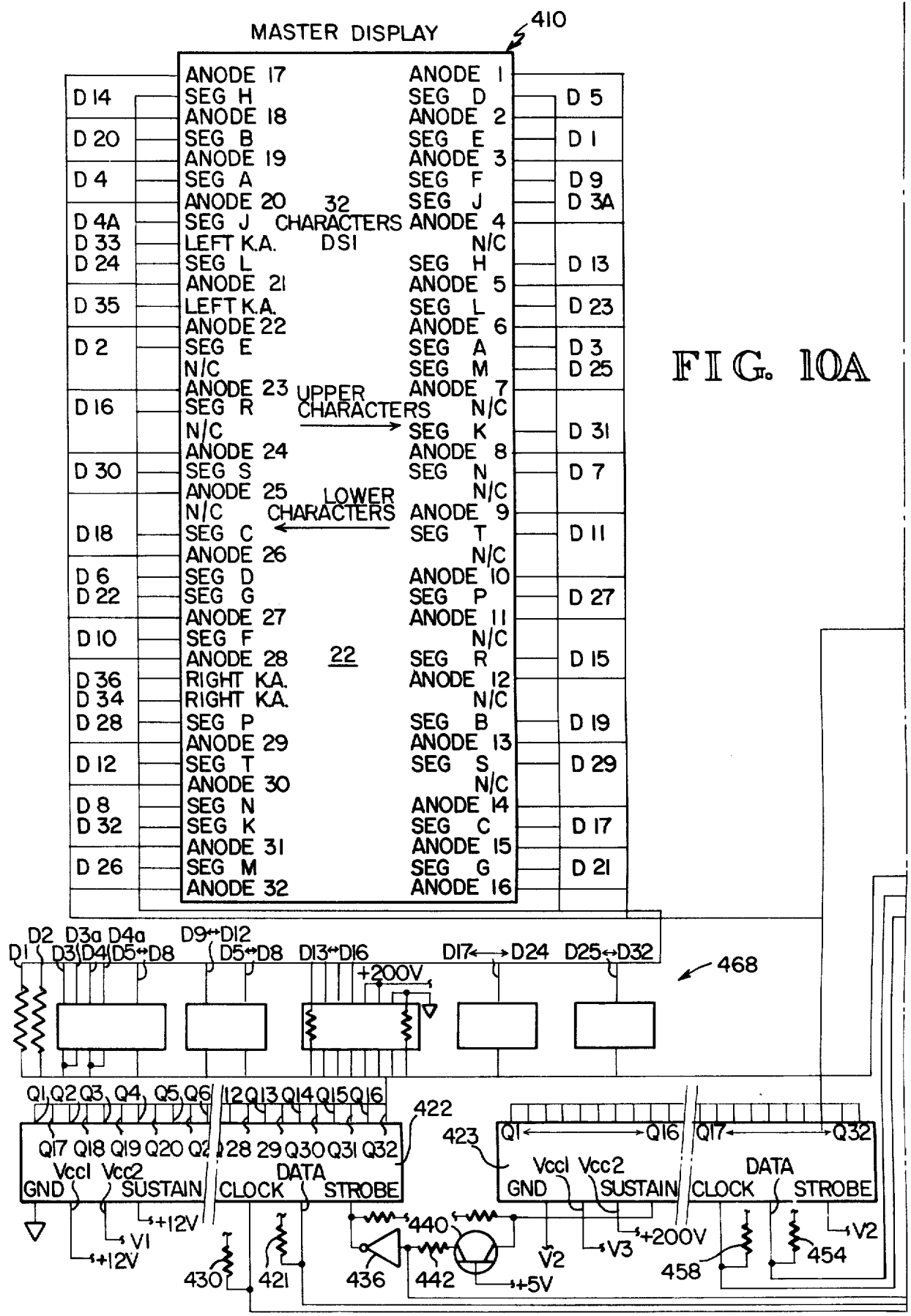
FIG. 10, consisting of A and B, is a schematic of circuitry for driving an alphanumeric display.

The display driver circuitry, as illustrated in FIG. 10, includes a master display section 410, including the display 22 on one panel 16 and a slave display section 412, including the display 22, on the opposite panel 18. Since the slave display 412 is connected in parallel with the master display 410, only the master display is explained herein. Basically, each digit of the display 22 includes seven light-emitting diodes or segments which may be selectively illuminated to generate letters or numbers. All segments are wired in parallel so that the segment data is simultaneously applied to all digits. However, only one digit is enabled at any time and appropriate segment data is applied to the display 22 when the corresponding digit is energized. The segment data signal SEG DATA is applied through inverter 420 to the DATA input of a display driver chip 422. The segment clock signal SEG CLK is applied to the input of inverter 424, having an open collector output to which power is applied through resistor 426. The output of inverter 424 is applied to inverter 428, which also has an open collector output to which power is applied through resistor 430. The output of inverter 428 is applied to the CLOCK input of the display driver chip 422. The STROBE input is applied through a inverter 432, having an open collector connected to power through resistor 434. The output of inverter 432 is applied to a second inverter 436 through capacitor 438. The input to inverter 436 receives a positive voltage from the emitter of transistor 440 through resistor 442. Resistor 442 and resistor 444 form a voltage divider which biases the input to inverter 436 at slightly above zero volts. In the presence of a negative-going STROBE input, the output of inverter 432 goes high, thereby applying a high to the input of inverter 436, which applies a low to the STROBE input of the display driver chip 422. Capacitor 438 then starts to discharge but nevertheless maintains the input to inverter 436 high. At the termination of the negative-going STROBE pulse, the output of inverter 432 goes low, thereby applying a low, and possibly negative voltage, to the input of inverter 436. However, diode 446 is provided to discharge capacitor 438 in the event that a negative voltage would be applied to inverter 436. The STROBE input to the digit driver 422 enables the digit driver chip 422, thereby energizing the selected segments of the enabled digit.

The digit data signal D DATA is applied to the emitter of transistor 450 through resistor 452. The collector of transistor 450 is connected to power through resistor 454 so that transistor 450 acts as a non-inverting driver. A similar circuit consisting of resistors 456,458 and transistor 460 drives the CLOCK input of the display driver chip 423 from the data clock D CLK input. In operation, the digit driver chips 422,423 are programmed by serially writing data into the chips 422,423 corresponding to the energized segments for each digit. The display driver 422 selects the segments to be energized through resistors 468 while the digit display driver 423 determines which digit of the display 22 is being energized. The display circuitry thus records data which is displayed at the frequency of the segment clock and digit clock and is periodically updated through the segment data SEG DATA and digit data inputs.

The output expander 400 is also used to operate the printer 24. The printer 24 contains a print head consisting of twenty-six horizontally arranged sets of five heater elements arranged in a row to allow twenty-six characters to be placed across a page. Thus, in operation, heater elements in a predetermined arrangement in each set are simultaneously energized, with each set being energized in sequence. The paper is then incremented by one row before the procedure is repeated. Corresponding heater elements are connected to the collectors of respective driver transistors 480 having their emitters connected to each other and to a supply voltage. The bases of the transistors 480 are connected to respective drivers 482 through respective resistors 484. Power is thus simultaneously applied to the heater elements of all twenty-six sets. The particular set of heater elements which is energized is controlled by the outputs of drivers 486, which are in turn controlled by latches 488. Data from the data bus is written into the latch by a pulse generated by a decoder 490 when enabled by decoder 374. The data stored in the latches 488 and in output expander 400 energizes each of the twenty-six outputs individually in sequence so that each set of heater elements is sequentially energized. After all heater elements in a line have been energized, a stepper motor is driven through inverters 490 and drivers 492 and respective transistors 494. Finally, a switch 496 may be energized to manually advance the paper.

Figure 12:
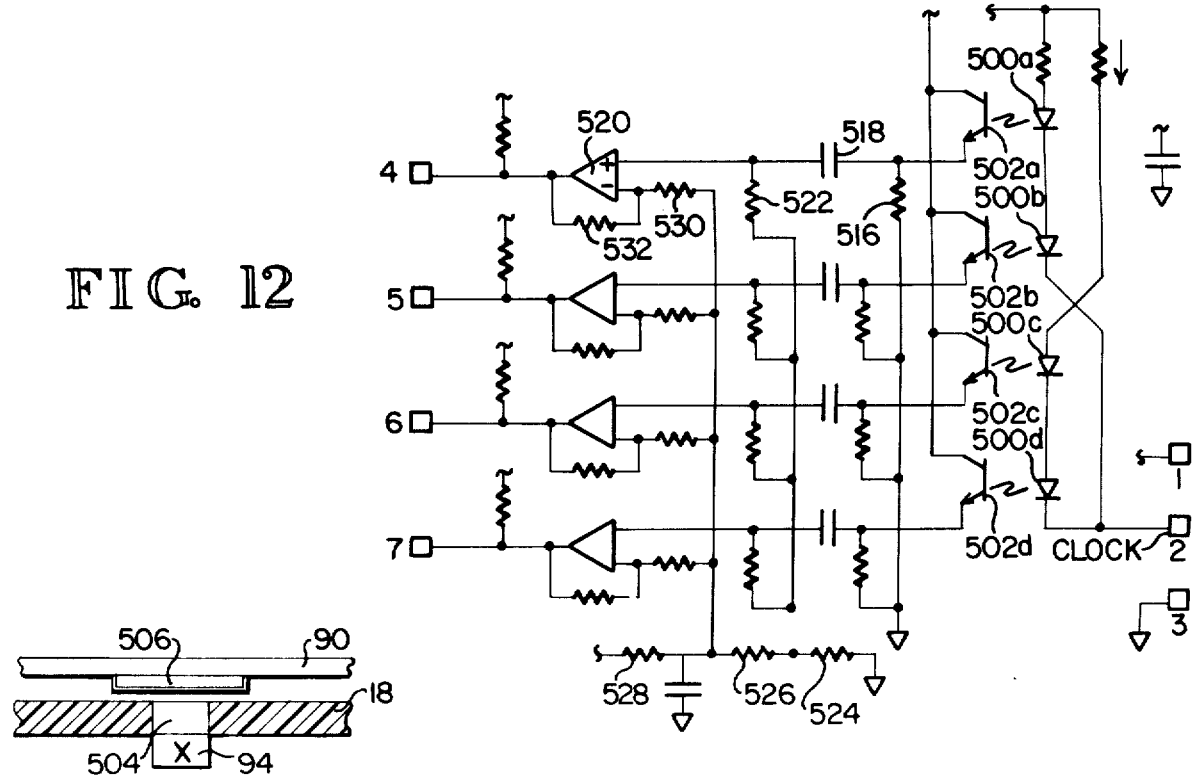
FIG. 12 is a schematic of detector circuitry for reading the identifying markings on removable overlays.
Figure 13:
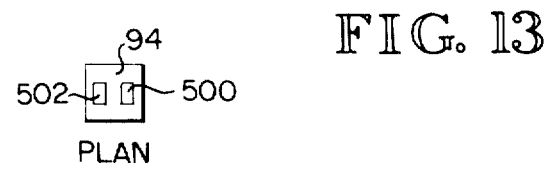
FIG. 13 is a cross-sectional view showing the manner in which the identifying markings of the removable overlays are detected.

The microprocessor 304 thus acts as a peripheral controller to control the operation of the serial I/O port 370, display 22 and printer 24. It also receives outputs from an overlay detector, illustrated in detail in FIGS. 12 and 13. In FIG. 13, each light-emitting/light-detecting pair 94 includes a light-emitting diode 500 and a light detector 502. The light emitter/detector is positioned behind an aperture 504 formed in the panel 16. The overlay is placed against the panel 16, as explained above, with an identification dot 506 positioned adjacent the aperture 504. The dot 506 is either silver or black. A black dot 506 absorbs light emitted by the light-emitting diode 500 so that the light detector 502 does not detect light. A silver dot 506 reflects light emitted by the light-emitting diode 500 so that the detector 502 detects light. The light-emitting diodes 500*a–d* are connected in a series parallel combination between the power supply line and the clock signal generated at the output of driver 510 (FIG. 9). The detector 502 is a phototransistor having a collector connected to the supply voltage and an emitter connected to ground through resistor 516 and to the non-inverting input of an operational amplifier through capacitor 518. Thus, when light is reflected from a silver dot to the photodiode 502, the emitter of the phototransistor 502 goes high each time the clock signal goes low. The non-inverting input of the operational amplifier 520 is biased at a relatively low voltage through resistor 522 by a voltage divider network consisting of resistors 524, 526 and 528. The inverting input of operational amplifier 520 is biased at a higher voltage by the voltage divider through resistor 530. The gain of the amplifier as set by the ratio of resistor 532 to resistor 530 is a relatively high value so that the amplifier 520 causes an abrupt switching of the output. Thus, when a silver dot 506 is placed adjacent the detector 94, the output of the amplifier 520 applies respective lows to the B port inputs of the I/O device 302. The microprocessor 304 is then able to identify which overlay is placed on the device. Since the messages recorded in the message blocks are stored in the read-only memory chips 306-312, the microprocessor 304 is able to identify the messages corresponding to the message block locations.

Although the non-verbal communication device utilizes two microprocessors 100,304, an explanation of the program for controlling the microprocessors 100,304 can best be explained with reference to a single flow chart since the microprocessors 100,304 operate in conjunction with each other. In actuality, the microprocessor 100 controls most of the operating functions, with the microprocessor 304 controlling only the peripheral devices and the overlay identification detector. When power is initially applied to the device, the microprocessor 100 enters a reset subroutine in which the internal random access memory is cleared at 600, an internal timer is initialized at 602, and internal interrupts are enabled at 604. The program then waits for a predetermined period at 606 to allow the A/D converter 204 (FIG. 8) to obtain digital values indicative of its inputs. Assuming that the program has run properly, the self-test light-emitting diode 242 is illuminated at 608 to indicated successful I/O processing. The program then initializes the printer and display by applying a RESET signal to the peripheral control circuitry illustrated in FIG. 9.

Figure 11:
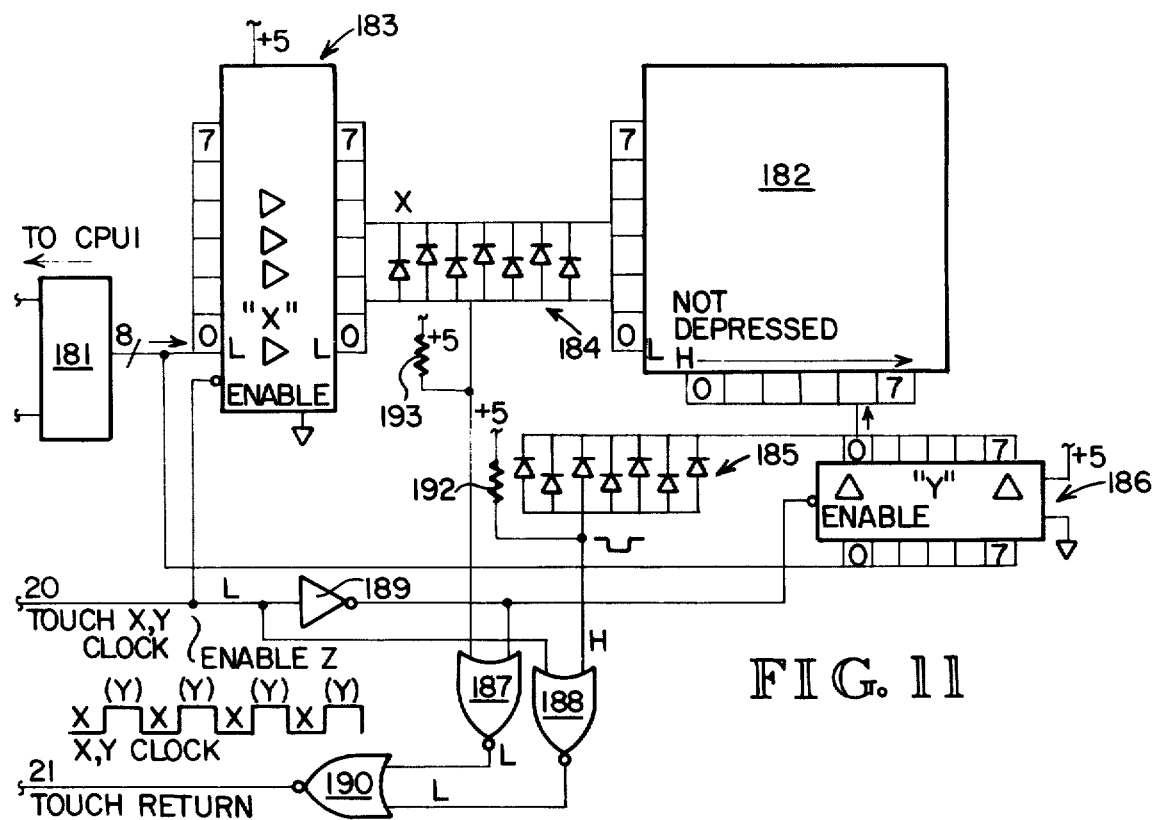
FIG. 11 is a schematic of the circuitry for accessing a direct select keyboard for the communication device.

After the reset subroutine has been completed, the mainline program is entered at 612. The first operation in the mainline program is to wait at 614 for an interrupt service routine to complete a scan of columns. While remaining in 614, the program tests the status of various I/O devices by examining their outputs which have been stored in the random access memory of the microprocessor 100 by the I/O interrupt service subroutine. If an input from the direct select keyboard 182 (FIG. 11) is detected at 616, an appropriate switch closure is simulated at 618 corresponding to the selected message block and the program branches to 620. If an input from the direct select keyboard 182 is not detected at 616, the program tests a switch closure flag at 622 to determine if the switch 47 plugged in either jack 42 or 46 has been closed. If a switch closure is found at 622, the system branches to 624 to determine if the plug 49 was plugged into the row column jack 48 or the sequential scan jack 46. If the system is found to be in the sequential scan mode, the program branches to 620. If the program is found at 624 to be in the row/column mode, the program branches to 626 to determine if the message blocks are being scanned, either vertically or horizontally. If a vertical scan is in process, a switch closure causes the direction of the scan to switch from vertical to horizontal at 628, and control goes to 630 to reset an auto-move delay. If the scanning direction was found to be horizontal, the switch closure is treated as a message block select and the program transfers to 620 to process the selected function. If the display and printer are not active, the program transfers to 632 and then enters a subroutine illustrated in FIG. 18. The program first determines whether an environmental control flag is set at 640. The environmental control flag is set by selecting the message block bearing the designation "environmental control." If the environmental control flag is set, a further test is made at 642 to determine if a "clear" message block is selected, which would extinguish the environmental control flag. If so, the program branches through 644, in which the environmental control flag is reset and returns to the mainline program via 646. If the "clear" message block is not found to be selected at 642, the selected message blocks are translated to an appropriate ultrasound code at 648 and the microprocessor 100 outputs the code to the ultrasonic transducer 252 (FIG. 8) at 650 before returning to the mainline program via 646. When the environmental control message block is set, the program in 648 converts the message block in corresponding ultrasound messages compatible with a conventional BSR series of remote control units. These message blocks may be numbers indicating specific devices to be controlled or they may be commands, such as "bright," "dim," "all on," "all off," or the like.

If the environmental control flag has not been found to be set at 640, the program tests at 652 for the selection of special message blocks which perform specific functions. If a "clear" message block is selected, the microprocessor 100 clears the panel 16,18 at 654. If the alarm message block is selected, the microprocessor applies an audio tone to the audio alarm 250 for a predetermined period at 656. If the environmental control message block is selected, the environmental control flag is set at 658, as mentioned above. Finally, if none of the special functions described above have been selected, the microprocessor 100 merely illuminates the selected message block at 660. In either case, the program then returns from the subroutine to the mainline program via 646.

Figure 14:
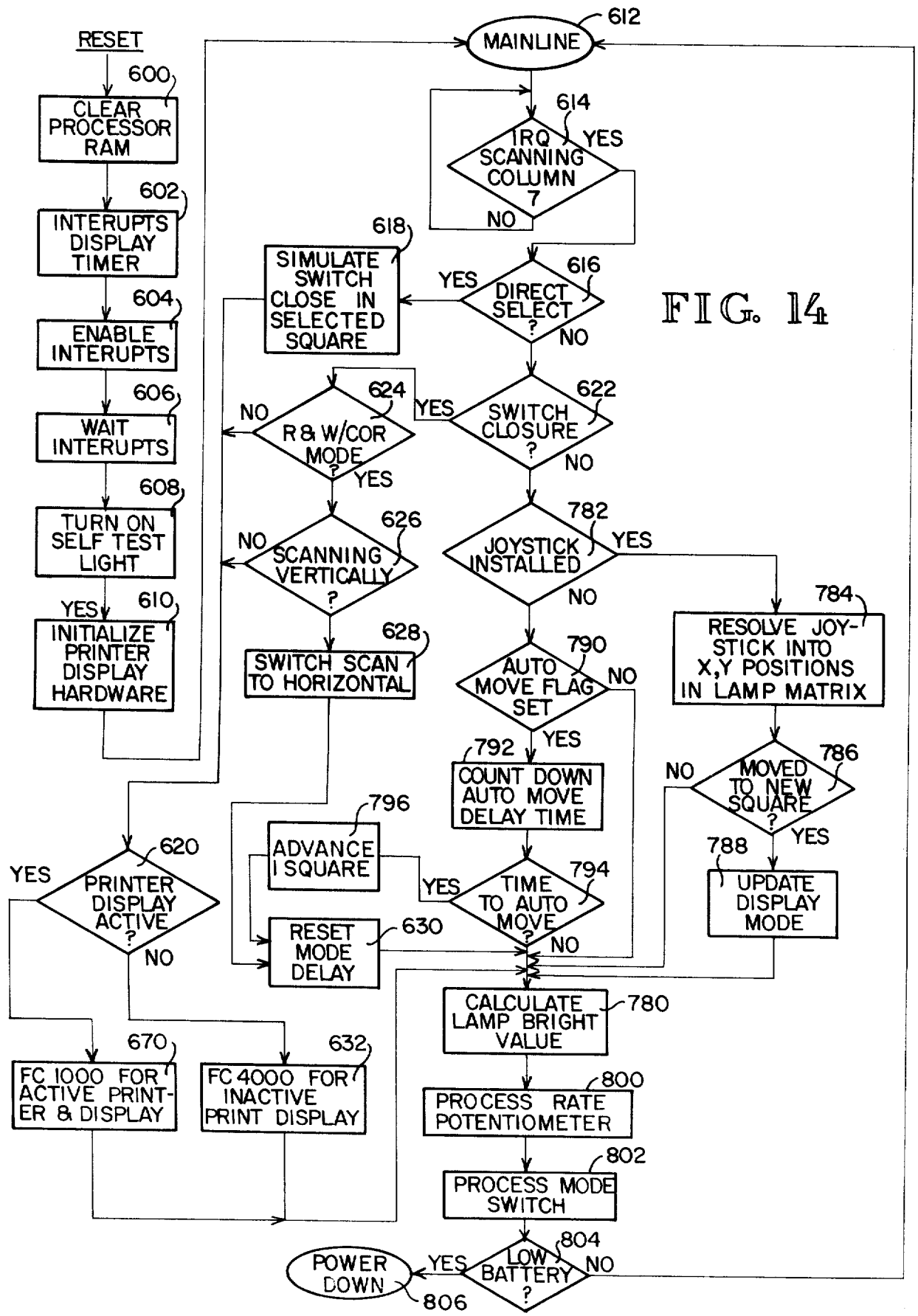
FIG. 14 is a flow chart of the mainline program of instructions for controlling the operation of the device.
Figure 15:
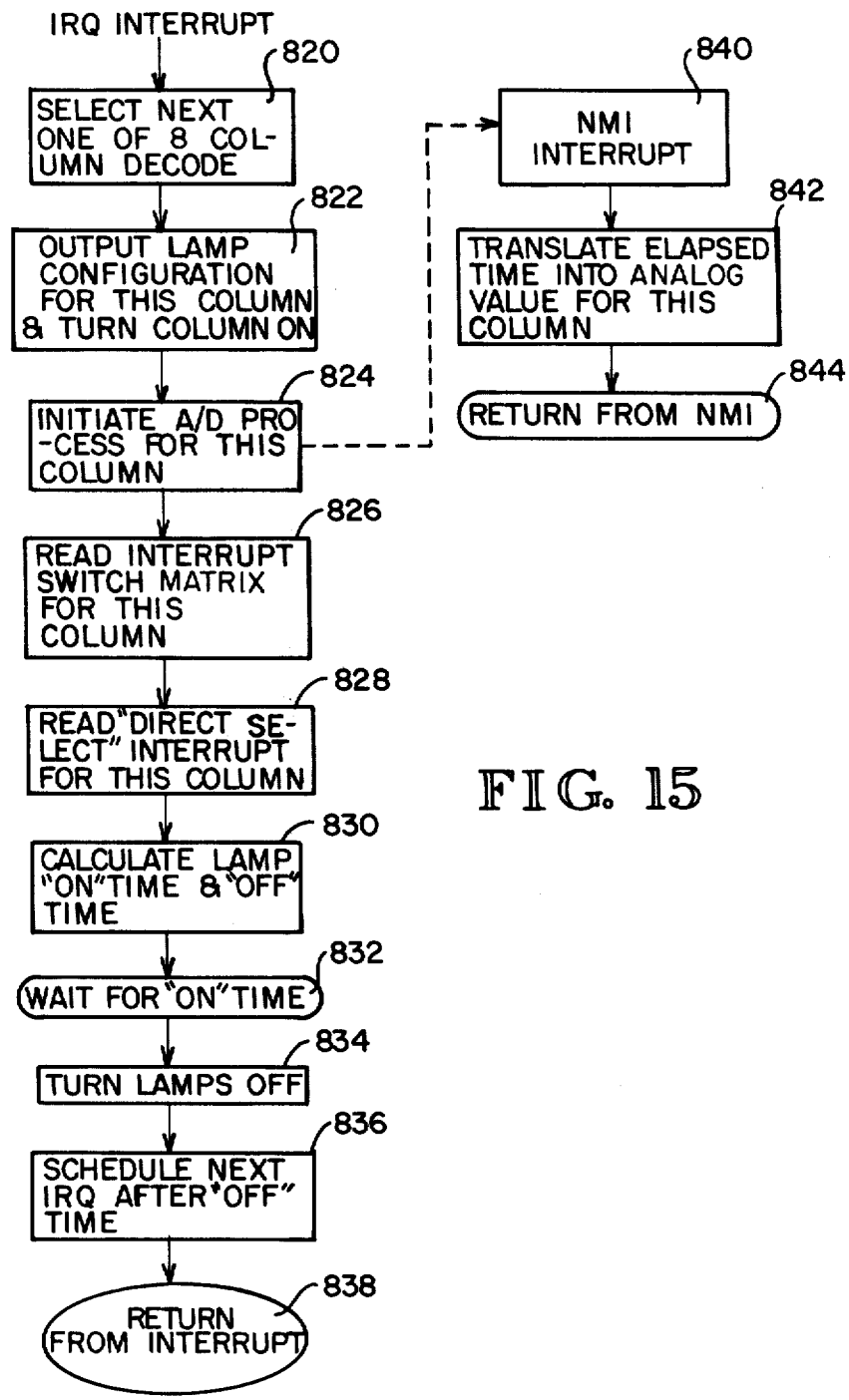
FIG. 15 is a flow chart of the interrupt request software for controlling the operation of the device.
Figure 16:
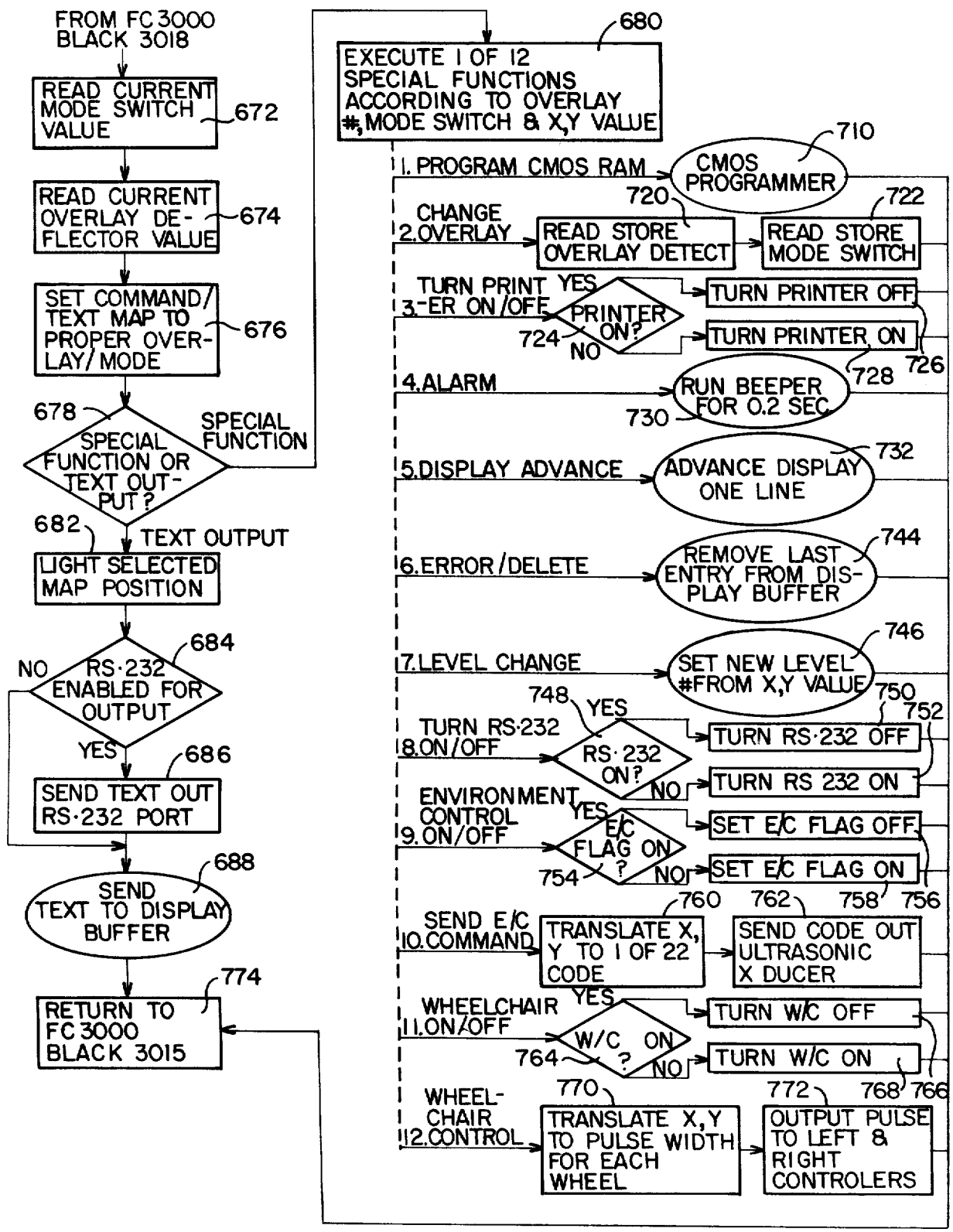
FIG. 16 is a flow chart of the software for controlling the peripheral devices.

Returning now to the mainline program of FIG. 14, if the printer/display have been found to active at 620, the program branches to 670, where a subroutine illustrated in FIG. 16 is called. Upon a switch closure with the printer active, the microprocessor reads the current setting of the mode switch at 672, and the overlay identification markings are read at 674. The microprocessor 100 then searches through the read-only memory chips 306-312 (FIG. 9) to locate the messages corresponding to that overlay. The presence of a special function selected is tested at 678, and, if the test is affirmative, control transfers to 680, where the selected special function is decoded and executed as explained in greater detail hereinafter. If a special function is not found to be selected at 678, the program transfers to 682, where the selected message block is illuminated. Following this, a test is made at 684 to determine if a selection has been made to send data through the serial I/O port. If so, test stored in memory is sent out through the serial I/O port 370 (FIG. 9) at 686. Following that, the text is transmitted to the display buffer by a subroutine which is called at 688 and illustrated in FIG. 17.

In the first step of the subroutine illustrated in FIG. 17, the program test whether there is room for the text on the top line of the display buffer and, if not, the program tests at 692 to determine if there is room on the bottom line of the display buffer. It it is found at 690 that there is room for the text on the top line, the text is moved to the top line of the buffer at 694 and the program returns to the subroutine of FIG. 16 via 696. If there is not room for the text on the top line of the buffer, but there is room for the text on the bottom line, the text is moved to the bottom line at 698 before returning to the subroutine via 696. Finally, if there is neither room for the text on the top line or the bottom line, the display is advanced one line at 700 and the text is then moved to the bottom line of the buffer at 698 before returning via 696.

If the program determines at 678 that a special function has been selected, the function is decoded in block 680 and executed as follows:

1. Program CMOS RAM

If the special function is the programming of a CMOS random access memory, a subroutine illustrated in FIG. 17 is called at 710. The subroutine is entered at 712 and, in 714, the serial I/O port is set up for input and data is entered into the communications device via the serial I/O port at 716. The data is entered at 716 in two hundred twelve lines of ASCII characters which are used to define four levels of text for each message block of the fifty-three blocks of the device. The subroutine then returns via 718.

2. Change Overlay

The overlay sensor (FIG. 12) is scanned at 720, the mode switch 36 (FIG. 1) is scanned at 722, and the values thus obtained are stored in microprocessor random access memory.

3. Turn Printer On/Off

The printer flag is tested at 724 and, if on, it is turned off at 726. If the printer flag is off, it is turned on at 728. The flag is thus set or reset by selecting the message block bearing the designation "printer on" (FIG. 7).

4. Alarm

The microprocessor sends a 2.5 kHz square wave to the audible alarm 250 (FIG. 8) for 0.2 second at 730.

5. Display Advance

In a display advance, a subroutine illustrated in FIG. 17 is called at 732. In the subroutine, the status of the printer 24 is checked at 734 and, if turned on, the top display line is copied into the printer buffer and printed at 736. The subroutine then enters 738 after 736 or if the printer is not found to be on at 734. At 738, the bottom line of display is moved to the top line and the bottom line is blanked at 740 before returning to the mainline program via 742.

6. Error/Delete

When the "Error/Delete" message block is selected, the microprocessor blanks the display 22 at 744 in the reverse direction until the beginning of a line is reached or a blank is encountered.

7. Level Change

When the elected level identification block (FIG. 7) switches, the microprocessor stores the new level in random access memory for later use at 746.

8. Enable Serial I/O Port

When the serial I/O port is enabled for output, a test is made at 748 to determine if it is currently enabled. If so, it is disabled at 750 and, if not, it is enabled at 752.

9. Environmental Control

A test is made at 754 to determine if the environmental control is currently enabled. If so, it is disabled at 756 and, if not, it is enabled at 758.

10. Send Environmental Control Command

When an environmental control command is to be sent, the microprocessor translates the selected message block into a one-of-twenty-two bit string code compatible with a BSR receiver at 760. This code is then applied to the ultrasound transducer 252 at 762. A test is first made at 764 to determine if the wheelchair flag is set. If so, it is reset at 766 and, if not, it is set at 768.

11. Wheelchair control

As mentioned above, the wheelchair control is accomplished with the help of two commonly available, digital proportional remote control devices. The microprocessor controls these devices by sending pulses of varying width which is calculated at 770 and output at 772. Upon executing the special functions, the subroutine returns to the mainline program via 774 and jumps to block 780.

If the program detects neither the direct select at 616 nor the switch closure at 622, it then tests for the presence of a joy stick input at 782. If a joy stick is installed, the digital values corresponding to the joy stick outputs from A/D converter 204 (FIG. 8) are resolved into corresponding message blocks according to the number of cells 80 per message block, determined by the mode switch. This function is accomplished at 784. The current position, determined by the joy stick, is compared to the previous position at 786 and, if the position designated by the joy stick has moved, the display panel is updated at 788.

If a joy stick input is not found to be present at 782, the program tests for an auto-move flag at 790 to determine if an auto-scan mode is enabled. If so, a random access memory counter is decremented at 792 and tested at 794 to determine if the scan has remained stationary for more than a predetermined period. If so, the scan is advanced one square at 796 and the delay counter is reinitialized at 630.

AFter all optional processing is completed as described above, every branch leads to step 780, where the program calculates the on-time for each of the lamps 78 in accordance with the intensity of ambient light. After the calculation is made at 780, the program calculates an move repeat rate" at 800 based on the position of the rate potentiometer 38. The program then calculates the position of the input mode switch at 802 to determine the desired operating mode. Finally, the voltage of the internal battery is tested at 804 and, if below a predetermined minimum voltage, the device enters a power-down subroutine at 806. Otherwise, the program returns to the mainline entry point 612.

Upon receipt of an interrupt by the microprocessor 100, a random access memory based counter is incremented to keep track of which I/O hardware the interrupt will service. The configuration of the current column of illuminated lamps is read from random access memory and output to the display at 822. A signal is then applied to the START input of the analog-to-digital converter 204 (FIG. 8) at 824 to allow the converter 204 to start its single-slope timing sequence for the selected input. The switch matrix is then tested at 826 for a switch closure and the direct select keyboard is tests at 828. These inputs are all recorded by the microprocessor random access memory for use in the mainline program described above. After all the inputs have been recorded, the microprocessor calculates the desired on-time at 830 and waits at 832 for that time to elapse. The lamps are then turned off at 834 and an internal timer is programmed at 836 to interrupt again after the off-time has elapsed. The portion of the mainline program being executed when the interrupt occurred is then returned via 838.

Asynchronously to the above process, after the analog-to-digital converter has been started, it interrupts the microprocessor 100 using the NMI input when the analog-to-digital conversion is finished. Upon being interrupted at 840, the microprocessor translates the value of elasped time into an analog value at 842 and stores it in random access memory. The program then returns to the mainline program being executed when the interrupt occurred via 844.

The device may also operate in a mode in which the message blocks 20 are sequentially scanned as long as the switch 47 is held down. Releasing the switch 47 stops the scan, thereby selecting the currently illuminated message block. This scanning mode is automatically selected by plugging the plug 49 into the rearming jack 48.

I claim:

1. A non-verbal communication device, comprising:
   a plurality of optically isolated light cells arranged in a matrix, each of said cells having a first open end and an opposing second open end;
   individually energizable, light-emitting means mounted in each of said cells for simultaneous transmission of light emitted to said first and second open ends;
   a first light-transmissive panel covering the first open ends of said cells and a second light-transmissive panel covering the second open ends of said cells;
   a removable overlay covering said first and second panels, said overlay having a first portion with messages arranged in a plurality of discrete message blocks which are superimposed on said first panel over respective cells of said matrix, and a second portion with identical messages arranged in a plurality of discrete message blocks which are superimposed on said second panel over respective and corresponding cells of said matrix to position the same message on the opposite sides of said cells;
   a removable bracket having a first light-transparent side covering said first portion of said overlay, and a second light-transparent side covering said second portion of said overlay, said first and second sides being in opposing relationship and biased toward each other to hold said first portion of said overlay in place against said first panel, and second portion of said overlay in place against said second panel; and
   means for allowing an individual to selectively energize each of said light-emitting means to communicate the message contained in a message block illuminated by said light-emitting means to a second party positioned to view said second position of said overlay while said individual is positioned to view said first portion of said overlay.

2. The communication device of claim 1 wherein each of several overlays are marked with an identification code which uniquely defines said overlay, said device further including:
   a non-volatile memory for storing the messages, respective message block locations and identification code for each of said overlays;
   code reader means for reading the identification markings on each overlay as it is placed on said panel in order to determine the identification code for such overlay; and
   processor means for correlating the messages for said overlay stored in said non-volatile memory, with each cell having an energized light-emitting means to allow said processor means to determine the messages selected by said individual.

3. The communication device of claim 2, furtherincluding accumulator means to which said messages are transmitted by said processor means to allow a plurality of sequentially selected messages to be accumulated.

4. The communication device of claim 3 wherein said accumulator includes a random access meory addressable by said processor means for storing data corresponding to said messages.

5. The communication device of claim 4, further including serial input/output interface means comprising a clock for generating a plurality of clock pulses and a shift register receiving said data from said random access memory in parallel and sequentially outputting said data through a serial input/output port.

6. The communication device of claim 5, further including means for allowing said shift register to receive data in serial from an external device and for periodically transferring said data to said random access memory in parallel.

7. The communication device of claim 3 wherein said accumulator means includes buffer means for temporarily storing a plurality of messages, an alphanumeric display having a plurality of digits, each of which includes a plurality of individually energizable light-emitting segments adapted to form an alphanumeric character, and display driver means receiving the contents of said buffer means and sequentially energizing the segments of each display which correspond to each character of the messages stored in said buffer means.

8. The communication device of claim 3 wherein accumulator means includes printer means for printing said messages as they are selected.

9. The communication device of claim 1, further including means for adjusting the intensity of light from said light-emitting means in accordance with the intensity of the ambient light, comprising:
   light-sensing means for providing an output indicative of the intensity of ambient light; and
   processor means for periodically energizing the light-emitting means in the cells for selected messages, said light-emitting means being energized for a duration which is proportional to the intensity of ambient light.

10. The communication device of claim 1, further including means for generating an output to control an external device, said output being initiated by selecting a predetermined message block on said overlay.

11. The communication device of claim 10 wherein said output is an ultrasonic audio signal coded in accordance with the message block selected on said overlay.

12. The communication device of claim 10 wherein said overlay includes message blocks bearing respective wheelchair manipulation commands and wherein said output is adapted to operate a wheelchair in accordance with the commands selected on said overlay.

13. The communication device of claim 12 wherein said outputs are two in number, each of which is adapted to control one wheel of a two-wheeled wheelchair, said output being a predetermined frequency for a command which requires a respective wheel to be stopped, and said output being a frequency above or below said predetermined frequency responsive to a selected command which causes the respective wheel to move forwardly or rearwardly.

14. The communication device of claim 1 wherein each message on said overlay is positioned adajcent other messages which are most likely to be selected following the selection of such message.

15. The communication device of claim 1 wherein each message block contains a plurality of messages and said first and second panels of said overlay each further includes a plurality of identical message designating blocks, said message designating blocks corresponding in number to the number of messages in each message block and being superimposed over respective cells of said matrix, said message designating blocks being individually selectable by energizing a corresponding light-emitting means and correlated to one message of said plurality of messages contained in a message block to indicate which of said plurality of messages said individual desires to communicate when a message block is illuminated.

16. The communication device of claim 1 wherein a plurality of message blocks may be sequentially illuminated, said device further including means for removing energy from said energized light-emitting means when a predetermined message block is selected.

17. The communication device of claim 1, further including means for simultaneously energizing the light-emitting means in a plurality of cells in blocks, the number and arrangement of cells forming said blocks being manually adjustable.

18. The communication device of claim 1 wherein said message blocks are scanned in a plurality of patterns under control of a manually actuatable switch which is plugged into a plurality of jacks corresponding to respective scan patterns, said communication device further including processing means for determining in which jack said switch is plugged and for scanning said message blocks in the pattern corresponding to said jack.

19. The communication device of claim 18, further including a direct select keyboard for allowing specific message blocks to be selected, said keyboard comprising:
  a transparent switch panel positioned in front of said overlay, said panel having a plurality of switch contacts corresponding in number and position to said message blocks; and
  processor means for determining which switch contact has been closed and for illuminating the light-emitting means for the message block corresponding thereto.

20. The communication device of claim 15 wherein said overlay containing a plurality of messages in each message block is marked with an identification code comprised of a plurality of identification markings which uniquely defines said overlay, and each of said messages in a message block corresponds to a selectable message designating block, said device further including:
  a non-volatile memory for storing each of said messges and its corresponding message designating block, respective message block and message designating block locations on said overlay, and said identification code for said overlay;
  code reader means for reading said identification markings on said overlay as it is placed on said panel to determine the identification code for such overlay;
  detection means for determining the message designating block and message block illuminated by said individual when selectively energizing said light-emitting means; and
  processor means for correlating the messages for said overlay stored in said non-volatile memory with the message designating block and message block said detector means determines are illuminated by said individual to determine the message selected by said individual.

21. The communication device of claim 20, further including:
  accumulator means to which said selected messages are sequentially transmitted by said processor means and temporarily stored to allow a plurality of selected messages to be accumulated in the order received; and
  an alphanumeric display having a plurality of digits, each of which includes a plurality of individually energizable light-emitting segments adapted to form an alphanumeric character, and display driver means receiving the contents of said accumulator means and sequentially energizing the segments of each display which correspond to each character of the message stored in said accumulator means, whereby said individual may compose and simultaneously display sequentially selected messages.

22. The communication device of claim 15 wherein each of said message designating blocks is color coded, and each of said plurality of messages in said message blocks is color coded to correspond to the color coding of one of said message designating blocks.

23. A non-verbal communication device, comprising:
  a plurality of optically isolated light cells arranged in a matrix, each of said cells having a first open end and an opposing second open end;
  individually energizable, light-emitting means mounted in each of said cells for simultaneous transmission of light emitted to said first and second open ends;
  a first light-transmissive panel covering the first open ends of said cells and a second light-transmissive panel covering the second open ends of said cells;
  a removable overlay covering said first and second panels, said overlay having a first portion with a plurality of discrete message blocks which are superimposed on said first panel over resepctive cells of said matrix, each of said message blocks containing a plurality of messages, and a second portion with a plurality of discrete message blocks which are superimposed on said second panel over respective and corresponding cells of said matrix, each of said message blocks containing a plurality of messages identical to said messages contained in said message blocks of said first portion to position the same message on the opposite sides of said cells, said first and second portions each further including a plurality of identical message designating blocks which are superimposed on said first and second panels over respective cells of said matrix to position the same message designating block on opposite sides of said cells, said message designating blocks corresponding in number to the number of messages in each message block and each correlated to one message of said plurality of messages in a message block; and
  means for allowing an individual to selectively energize each of said light-emitting means corresponding to said message blocks to illuminate the message block containing the plurality of messages including the message to be communicated to a second party positioned to view said second por tion of said overlay while said individual is positioned to view said first portion of said overlay, and for allowing said individual to selectively energize each of said light-emitting means corresponding to said message designating blocks to indicate which of said plurality of messages in the illuminated message block said individual desires to communicate.

24. The communication device of claim 23 wherein said overlay is marked with an identification code comprised of a plurality of identification markings which uniquely defines said overlay, said device further including:

a non-volatile memory for storing each of said messages and its corresponding message designating block, respective message block and message designating block locations on said overlay, and said identification code for said overlay;

code reader means for reading said identification markings on said overlay as it is placed on said panel to determine the identification code for such overlay;

detection means for determining the message designating block and message block illuminated by said individual when selectivelya energizing said light-emitting means; and processor means for automatically correlating the messges for said overlay stored in said non-volatile memory with the message designating block and message block said detector means determines are illuminated by said individual to determine the message selected by said individual;

accumulator means to which said selected messages are sequentially transmitted by said processor means and temporarily stored to allow a plurality of selected messages to be accumulated in the order received; and display means to receive and visually display the contents of said accumulator means, whereby said individual may compose and simultaneously display sequentially selected messages.

* * * * *